United States Patent
Srivastava et al.

(10) Patent No.: US 12,382,420 B2
(45) Date of Patent: Aug. 5, 2025

(54) USER EQUIPMENT (UE) STEERING BETWEEN NETWORK SLICES FOR SERVICE CONTINUITY

(71) Applicant: Cisco Technology, Inc., San Jose, CA (US)

(72) Inventors: Vimal Srivastava, Bangalore (IN); Sri Gundavelli, San Jose, CA (US); Ravi Kiran Guntupalli, Cumming, GA (US)

(73) Assignee: Cisco Technology, Inc., San Jose, CA (US)

( * ) Notice: Subject to any disclaimer, the term of this patent is extended or adjusted under 35 U.S.C. 154(b) by 384 days.

(21) Appl. No.: 17/929,228

(22) Filed: Sep. 1, 2022

(65) Prior Publication Data
US 2024/0080792 A1 Mar. 7, 2024

(51) Int. Cl.
*H04W 64/00* (2009.01)
*H04W 60/00* (2009.01)

(52) U.S. Cl.
CPC ........... *H04W 64/00* (2013.01); *H04W 60/00* (2013.01)

(58) Field of Classification Search
CPC ... H04W 12/08; H04W 12/12; H04W 12/122; H04W 12/80; H04W 4/70; H04W 40/244; H04W 48/02; H04W 48/18; H04W 36/00; H04W 36/0072; H04W 36/0077; H04W 36/06; H04W 36/32; H04W 60/00; H04W 60/04; H04W 64/00
USPC ................ 455/433, 406, 435.1, 456.3, 456.1
See application file for complete search history.

(56) References Cited

U.S. PATENT DOCUMENTS

| | | | |
|---|---|---|---|
| 2018/0160395 A1 | 6/2018 | Laslo-Amit et al. | |
| 2018/0317163 A1* | 11/2018 | Lee | H04W 48/18 |
| 2020/0267639 A1 | 8/2020 | Wei et al. | |
| 2021/0136675 A1 | 5/2021 | Lee et al. | |
| 2021/0204198 A1* | 7/2021 | Xin | H04W 28/0268 |
| 2021/0329539 A1* | 10/2021 | Surisetty | H04W 48/16 |
| 2021/0385625 A1* | 12/2021 | Qiao | H04W 4/029 |
| 2022/0116860 A1 | 4/2022 | Wei et al. | |
| 2022/0386401 A1* | 12/2022 | Qiao | H04W 48/16 |
| 2023/0022005 A1* | 1/2023 | Qiao | H04W 64/00 |
| 2023/0093339 A1* | 3/2023 | Shu | H04W 76/10 370/329 |
| 2023/0247548 A1* | 8/2023 | Qiao | H04W 52/0219 370/311 |
| 2023/0388908 A1* | 11/2023 | Wang | H04W 48/18 |

(Continued)

*Primary Examiner* — Joseph Arevalo
(74) *Attorney, Agent, or Firm* — Polsinelli P.C.

(57) ABSTRACT

The present disclosure is directed to systems and techniques for providing service continuity for User Equipment (UE) services associated with certain network slices. In one example, the systems and techniques can receive a registration request from a UE, wherein the registration request includes a requested slice, and determine a current network location of the UE. In response to determining that the current network location of the UE does not support the requested slice, one or more additional network locations that support the requested slice can be identified. Location information associated with the one or more additional network locations can be identified and a registration response message can be transmitted to the UE, wherein the registration response message includes location information of an one or more additional Tracking Area Identities (TAIs) or additional Registration Areas (RAs) that support the requested slice.

20 Claims, 14 Drawing Sheets

(56) References Cited

U.S. PATENT DOCUMENTS

| | | | |
|---|---|---|---|
| 2024/0031970 A1* | 1/2024 | Suh | H04W 12/06 |
| 2024/0073848 A1* | 2/2024 | Ryu | H04W 36/08 |
| 2024/0236909 A1* | 7/2024 | Lataste | H04W 60/04 |
| 2024/0298253 A1* | 9/2024 | Talebi Fard | H04W 48/18 |

* cited by examiner

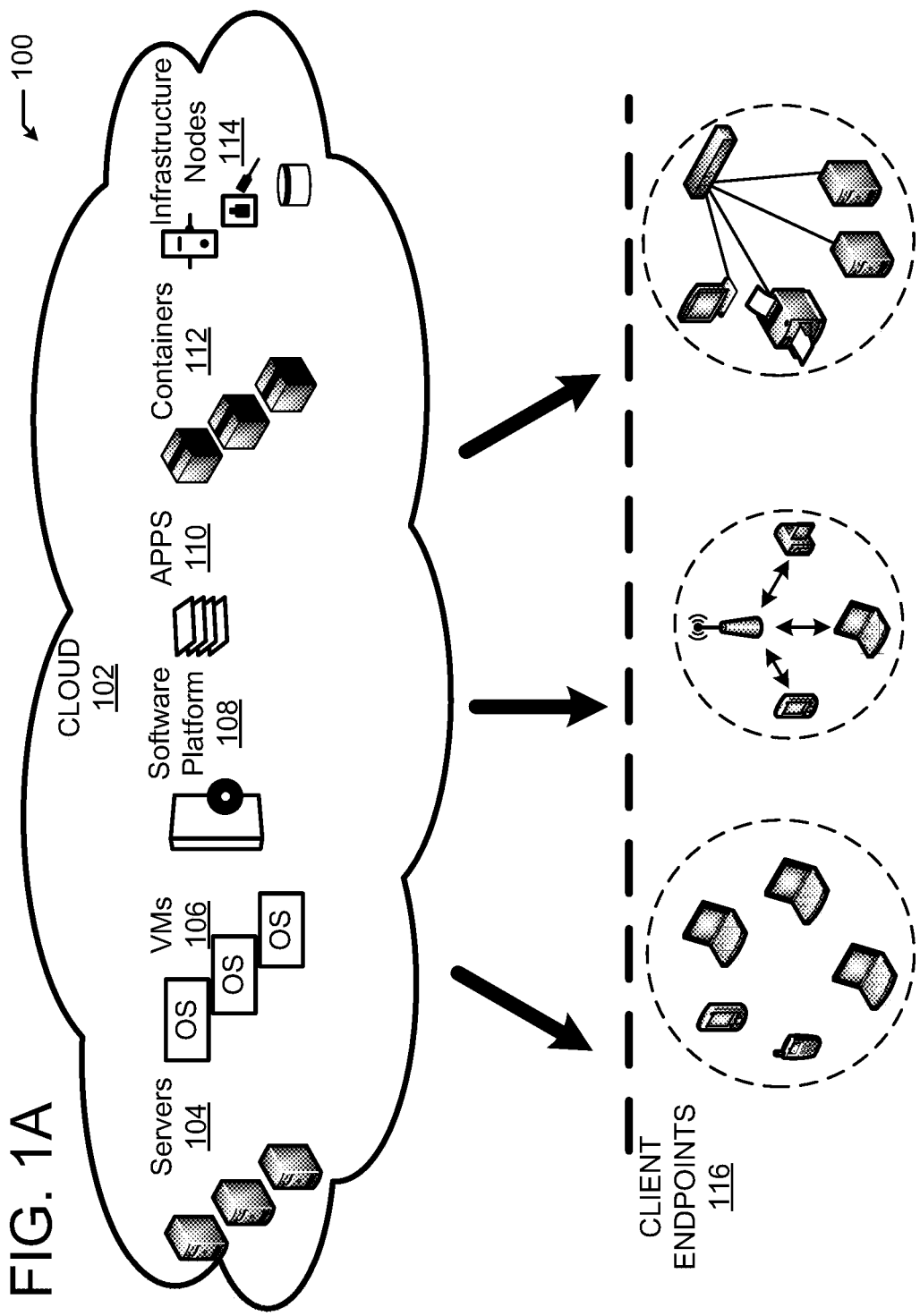

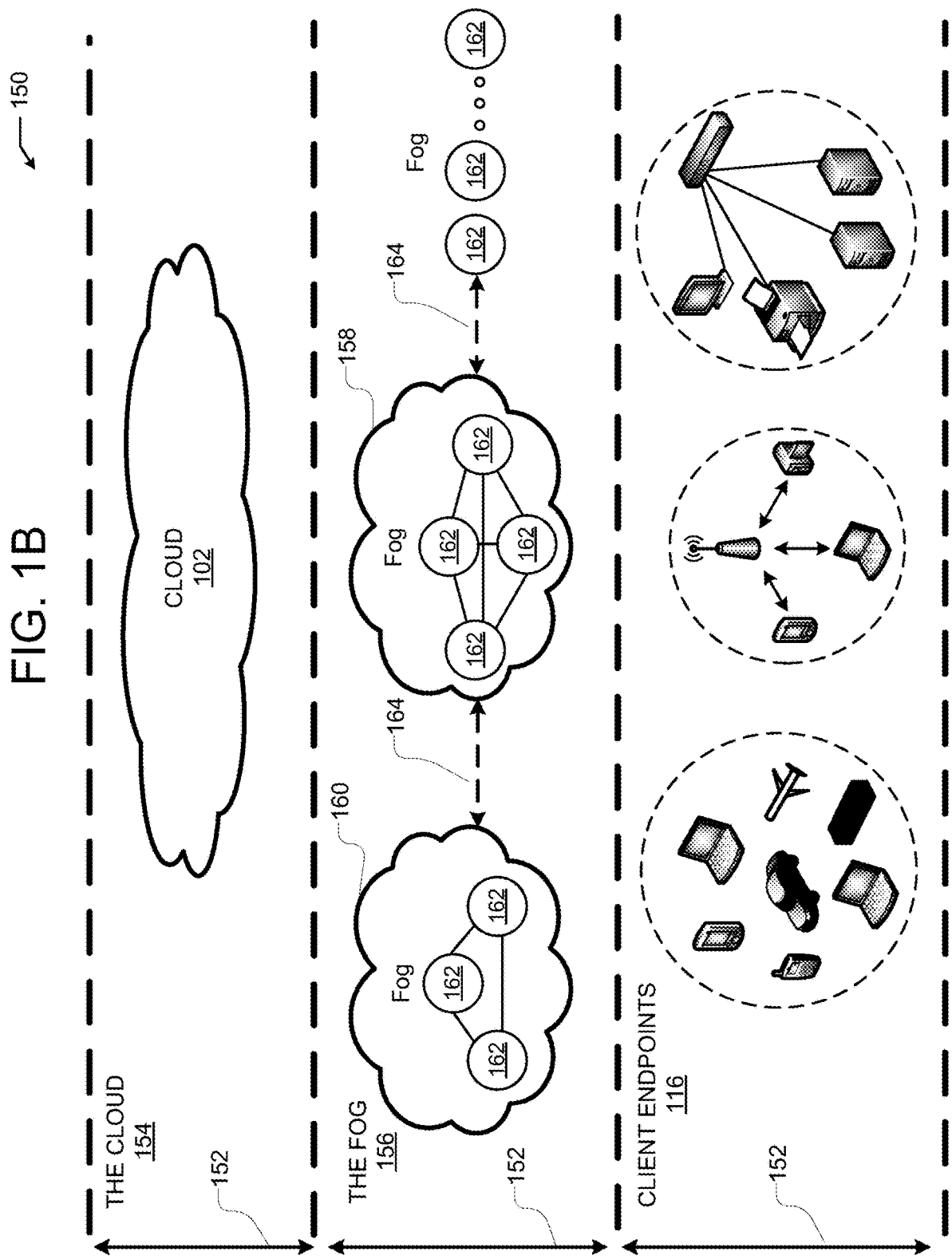

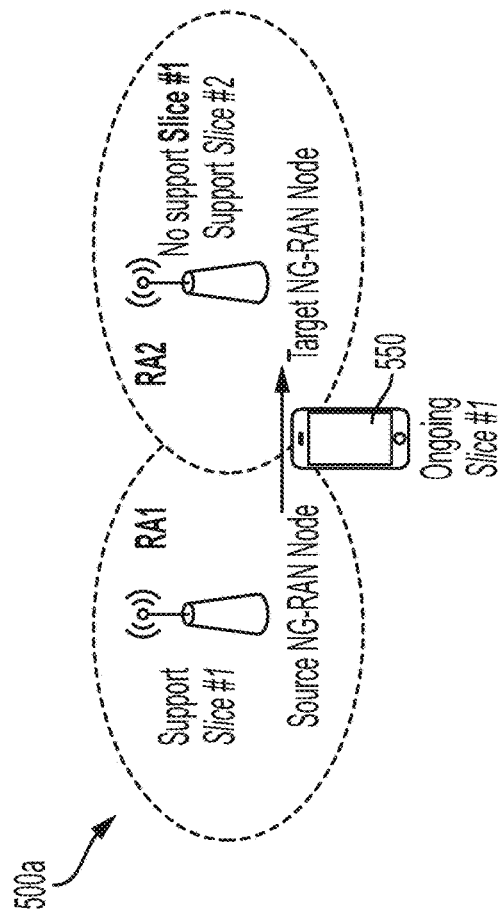 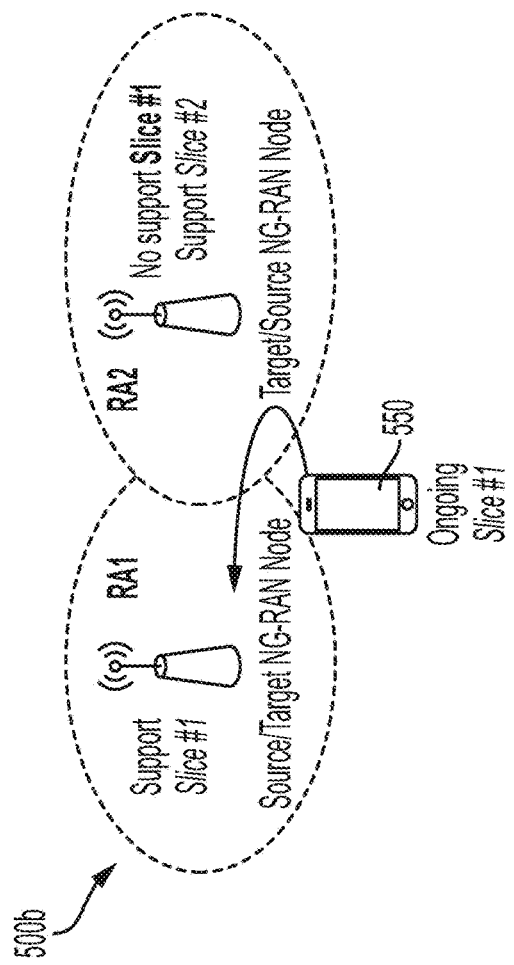
FIG. 5A
FIG. 5B

USER EQUIPMENT (UE) STEERING BETWEEN NETWORK SLICES FOR SERVICE CONTINUITY

TECHNICAL FIELD

The present technology pertains to wireless networks, and more particularly to providing service continuity for User Equipment (UE) services associated with certain network slices.

BACKGROUND

Mobile and wireless communication systems have begun to adopt fifth generation (5G) wireless communications that can provide increased data rates and lower latency. Due to a higher frequency of spectrum used to implement 5G wireless communications, a signal propagation range of 5G wireless communication signals may be smaller than the signal propagation range of existing wireless communication signals (e.g., 4G, 3G, etc.). To decrease propagation loss of 5G wireless communication signals and/or to increase an effective transmission distance, large-scale deployments of gNBs (5G base stations) and tight interworking of existing eNBs (3GPP/4G base stations) and non-3GPP access networks (e.g., Wi-Fi) may be implemented. In a dense network configuration that includes a large number of network nodes (e.g., gNBs, eNBs, and/or non-3GPP nodes), a user equipment (UE) can be configured to select an appropriate access network node before connecting to a 5G core network.

5G wireless communication systems and networks can implement network slicing in the cellular network domain. Such slicing can be used to provide isolation between network services on a per-slice basis. Network slicing can also be used to facilitate service level agreement (SLA) implementation and resource reservation on a per-slice basis. Network slicing can result in the creation of multiple end-to-end logical networks over a shared physical infrastructure. For example, network slicing can be used to implement multiple different network services and/or network service types in a single 5G network. In some cases, a User Equipment (UE) can use one or more different network slices simultaneously or concurrently. An Access and Mobility Management Function (AMF) included in a 5G network can assign a registration area to a UE during a registration procedure and/or can manage UE connections to various network slices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which:

FIG. 1A illustrates an example cloud computing architecture, according to some aspects of the present disclosure;

FIG. 1B illustrates an example fog computing architecture, according to some aspects of the present disclosure;

FIG. 5A illustrates another example of an inter-RA mobility event, according to some aspects of the present disclosure;

FIG. 5B illustrates an example scenario in which a UE returns to an original slice from a non-supported slice during inter-RA mobility events, according to some aspects of the present disclosure;

DETAILED DESCRIPTION

Figure 2:
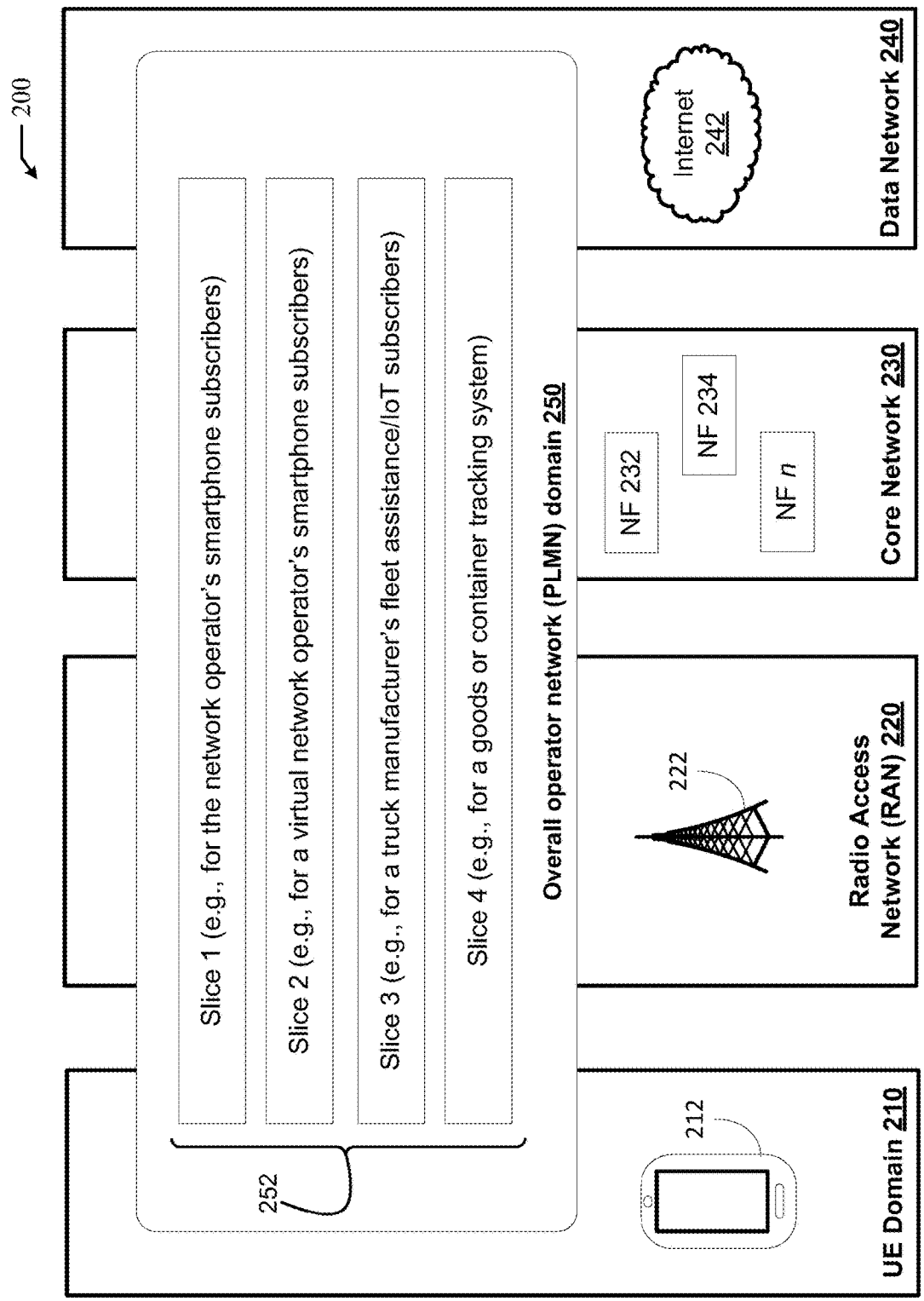
FIG. 2 depicts an exemplary schematic representation of a 5G network environment in which network slicing has been implemented, and in which one or more aspects of the present disclosure may operate.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, apparatuses, methods, and computer-readable media for providing service continuity for User Equipment (UE) services associated with a network slice. For example, the systems and techniques described herein can be used to provide service continuity for UE services that require and/or are associated with a specific network slice. In some aspects, the systems and techniques can be used to provide service continuity during Intra-Registration Area (Intra-RA) and/or Inter-RA mobility events of a UE. In some examples, the systems and techniques described herein can be implemented in a 4G cellular network core (e.g., Evolved Packet Core (EPC)), a 5G cellular network core (e.g., 5G Core (5GC)), etc.

For example, a method can include receiving a registration request from a User Equipment (UE), wherein the registration request includes a requested slice; determining a current network location of the UE; in response to determining that the current network location of the UE does not support the requested slice, identifying one or more additional network locations that support the requested slice; determining location information associated with the one or more additional network locations; and transmitting a registration response message to the UE, wherein the registration response message includes location information of one or more additional Tracking Area Identities (TAIs) or additional Registration Areas (RAs) that support the requested slice.

In one aspect, the location information is determined based on transmitting a message from an Access and Mobility Management Function (AMF) to a Network Slice Selection Function (NSSF).

In another aspect, the location information is a location hint comprising a Global Positioning System (GPS) location, a GPS coordinate, or a geotagged location.

In another aspect, the registration request includes an identifier of the requested slice.

In another aspect, wherein the identifier of the requested slice is a Slice-Network Slice Selection Assistance Information (S-NSSAI).

In another aspect, the current network location of the UE is determined as a current Tracking Area Identity (TAI) or a current Registration Area (RA) of a wireless network.

In another aspect, determining that the current network location of the UE does not support the requested slice comprises determining, based on network slice information obtained from a Network Slice Selection Function (NSSF), that a current Tracking Area Identity (TAI) or a current Registration Area (RA) of a wireless network does not support the requested slice.

In another aspect, the method includes identifying, in response to determining that the current network location of the UE does not support the requested slice, one or more additional TAIs or additional RAs that support the requested slice.

In another aspect, the one or more additional TAIs or additional RAs are associated with a nearby location relative to one or more of the current location of the UE, the current TAI, or the current RA.

In one aspect, a system is provided that includes one or more processors and one or more computer-readable storage media having computer-readable instructions stored thereon, wherein the computer-readable instructions, when executed by the one or more processors, cause the one or more processors to receive a registration request from a User Equipment (UE), wherein the registration request includes a requested slice; determine a current network location of the UE; in response to determining that the current network location of the UE does not support the requested slice, identify one or more additional network locations that support the requested slice; determine location information associated with the one or more additional network locations; and transmit a registration response message to the UE, wherein the registration response message includes location information of one or more additional Tracking Area Identities (TAIs) or additional Registration Areas (RAs) that support the requested slice.

In one aspect, one or more non-transitory computer-readable media includes computer-readable instructions that, when executed by one or more processors of a cloud-based deployment service, cause the cloud based deployment service to receive a registration request from a User Equipment (UE), wherein the registration request includes a requested slice; determine a current network location of the UE; in response to determining that the current network location of the UE does not support the requested slice, identify one or more additional network locations that support the requested slice; determine location information associated with the one or more additional network locations; and transmit a registration response message to the UE, wherein the registration response message includes location information of one or more additional Tracking Area Identities (TAIs) or additional Registration Areas (RAs) that support the requested slice.

In one aspect, an apparatus is provided. The apparatus includes means for receiving a registration request from a User Equipment (UE), wherein the registration request includes a requested slice; means for determining a current network location of the UE; in response to determining that the current network location of the UE does not support the requested slice, means for identifying one or more additional network locations that support the requested slice; means for determining location information associated with the one or more additional network locations; and means for transmitting a registration response message to the UE, wherein the registration response message includes location information of one or more additional Tracking Area Identities (TAIs) or additional Registration Areas (RAs) that support the requested slice.

Example Embodiments

Network slicing is expected to play an important role in 5G networks, based at least in part on the multitude of use cases and new services that 5G networks are capable of supporting. Network slicing is the partitioning of a single physical network into multiple virtual networks to offer optimal support for different types of services and for different types of users. By creating separate slices, for example, a Mobile Broadband (MBB) slice, a Massive IoT slice, or a Mission critical IoT slice, a 5G network operator can offer tailored solutions to particular customer use cases based on different transmission characteristics, quality of service (QoS) requirements, etc. Network slicing can further provide improved efficiency and performance, as well as enhanced service continuity via more effective roaming across networks. As such, it can be desirable for a UE to connect to an access network node that is capable of supporting the UE requested slice (e.g., a network slice associated with or required by a network service used by the UE).

In existing approaches, a selection of a network node may be based on factors such as signal strength, public land mobile network (PLMN) identifiers, or operator policy, etc. Among multiple choices of network nodes in the complex network, it is desirable for a UE to connect to a network node supporting a slice requested by the UE. With abundant nodes available in the coverage area, it is possible that a UE connects to a network node that does not support the UE service or slice requirement, which can lead to less efficient performance and possible failure of connectivity in the network. There exists a need for selecting a network node that can support a slice requirement of a UE, including scenarios in which a large number of nodes including gNBs, eNBs, and non-3GPP access networks coexist. There is also a need to reconfigure and/or reselect a network node such that a UE can be rerouted to the best available network node, which can serve the requested slice of the UE.

In some examples, UEs may be assigned to a registration area (RA) of a wireless communication network (e.g., a 5G network) by an Access and Mobility Management Function (AMF) when the UE registers with the AMF. A registration area is a set of tracking areas, wherein each tracking area consists of one or more cells that cover a geographical area. For example, a cell can be associated with a network node, such as an NG-RAN node. An Intra-RA mobility event occurs during handover of the UE between two nodes that are included in the same RA (e.g., from a source NG-RAN node to a target NG-RAN node). An Inter-RA mobility event occurs during handover of the UE between a source node of a first RA and a target node of a second RA.

UEs may use one or more services on an original slice that is available within the UE's initial RA. In general, the availability of a slice in a network is associated with the location of the UE. For instance, a UE is required to be present in a tracking area where a requested slice is available in order for the UE to use the services provided by that requested slice.

As such, if a UE is utilizing a service on a given slice within a first tracking area (e.g., the cell associated with a first NG-RAN node), the service continuity to the UE will be interrupted if the UE is handed over to a second tracking area (e.g., the cell associated with a second NG-RAN node) that does not support the same given slice. As such, during handover of a UE, if the target location does not support the slice on which the UE currently has a PDU session established, the PDU session will be released by the network. This can result in the denial of some critical services to a UE during Inter-RA mobility events and/or Intra-RA mobility events (e.g., whenever the UE experiences a handover between different tracking areas or cells).

For example, a UE might be at a specific location, such as a hospital, where the UE is using an Ultra-Reliable Low Latency Communication (URLLC) slice. If the UE moves to another location where the URLLC slice is unavailable (or unsupported), a UE session utilizing one or more URLLC services will be released. This can be undesirable for a variety of reasons, including the existence of Service Level Agreements (SLAs) specifying that services used on a UE's original slice are required to have continuity if the UE moves outside of the geographic area associated with the original slice.

The present technology includes systems, methods, and computer-readable media (also referred to as "systems and techniques") for solving these problems and discrepancies.

Figure 3:
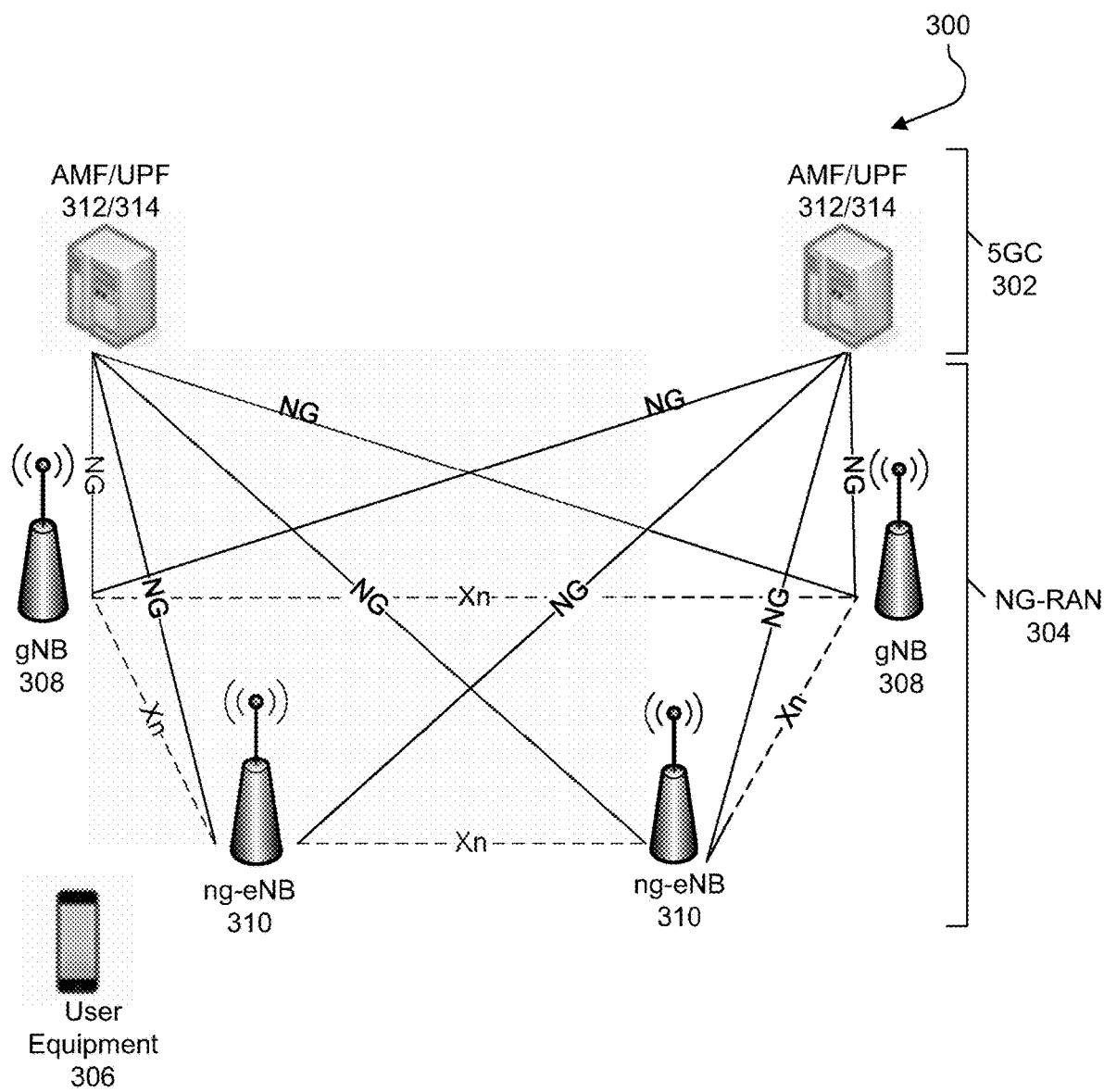
FIG. 3 shows an example next generation radio access network (NG-RAN) architecture, according to some aspects of the present disclosure.

A description of example network environments and architectures for network data access and services in which one or more aspects of the present disclosure may be provided are illustrated in FIGS. 1A, 1B, and 2; an example of a next generation radio access network (NG-RAN) with which one or more aspects of the present disclosure may be provided is illustrated in FIG. 3.

With respect to FIG. 1A, depicted is a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102.

The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure (e.g., through an LTE S14 interface) to alert the client endpoint of Wi-Fi availability through the Wi-Fi infrastructure. In another example, the cloud service can use the Wi-Fi infrastructure (e.g., through MBO Wi-Fi messaging) to alert the client endpoint of LTE availability through the LTE infrastructure.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network (s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210 (e.g., of one or more enterprises) in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, ..., n reside; and a Data Network 240, in which one or more data communication networks such as the Internet 242 reside. Additionally, the Data Network 240 can support SaaS providers configured to provide SaaSs to users in the UE domain 210.

Core Network 230 contains a plurality of Network Functions (NFs), shown here as NF 232, NF 234 ... NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure.

Across these four domains of the 5G network environment 200, an overall operator network domain 250 is defined. The operator network domain 250 is in some embodiments a Public Land Mobile Network (PLMN) and may be used to provide cellular service to end users in UE domain 210. Within the operator network domain 250, a plurality of network slices 252 are created, defined, or otherwise provisioned in order to deliver a desired set of defined features and functionalities for a certain use case or corresponding to other requirements or specifications of a UE and/or users in the UE domain 210. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 220, through the 5G access edge and the 5G core network 230, and to the data network 240. Moreover, note that this network slicing may span multiple different 5G providers.

For example, as shown in FIG. 2, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. In some examples, the operator network domain 250 can implement any number of network slices for provisioning SaaSs from SaaS providers to one or more UEs and/or users associated with UE domain 210, among other network services that may additionally or alternatively be provisioned.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In some examples, network slicing is expected to play a critical role in 5G networks because of the multitude of use cases and new services 5G is capable of supporting. Network service provisioning through network slices can be initiated when an enterprise or other user associated with UE domain 210 requests network slices when registering with AMF/MME for a 5G network. At the time of registration, the user will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services (e.g., based on requirements of the services) to the user.

FIG. 3 illustrates an example next generation radio access network (NG-RAN) architecture 300. A 5G system consists of 5G access network, 5G core network (5GC) 302, and User Equipment (UE) 306. The 5G access network includes NG-RAN 304 and/or non-3GPP access network (not shown) connecting to 5GC 302. The 5GC 302 includes one or more Access and Mobility Management Function (AMF) 312 and User Plane Function (UPF) 314. The NG-RAN 304 includes one or more NG-RAN node, which can be gNBs 308 and ng-eNBs 310. The gNBs 308 provide 5G NR user plane and control plane protocol terminations towards the UE 306. The ng-eNBs 310 provide LTE/4G user plane and control plane protocol terminations towards the UE 306.

The gNBs 308 and ng-eNBs 310 are interconnected with each other by using an Xn interface. The gNBs 308 and ng-eNBs 310 are connected to the 5GC 302 by using NG interfaces. More specifically, the gNBs 308 and ng-eNBs 310 are connected to the AMF 312 by means of an NG-C interface (e.g., N2 reference point), which is a control plane interface between the 5GC 302 and the NG-RAN 304. The gNBs 308 and ng-eNBs 310 are also connected to the UPF 314 by means of an NG-U interface (e.g., N3 reference point), which is a user plane interface between the 5GC 302 and the NG-RAN 304.

In some embodiments, each gNB 308 or ng-eNB 310, which can be called, in this example, a serving node, maintains a neighboring relationship table (NRT), which is managed by automatic neighbor relation (ANR) function. The NRT identifies an existence of neighboring nodes and shows a neighbor relation between the serving node and the neighboring nodes, thereby facilitating UE's handover to a neighboring node. The need for the manual configuration of a neighbor cell list is minimized as the ANR function automatically generates and updates the NRT by leveraging measurements carried out by UEs.

In some examples, as a UE (e.g., UE 306) moves from one coverage area (e.g., registration area) to another, the UE would need to connect to a new node and disconnect from the old node in the previous coverage area without discernable disruption to connectivity. Such handover (HO) events may be more frequent in a 5G network, as a large number of network nodes such as gNBs and ng-eNBs coexist in the same coverage area. Handovers require a serving node to have knowledge about the existence of neighboring nodes. As such, use of NRTs identifying the existence of neighboring nodes can help maximize the network throughput and minimize the probability of loss of connectivity and therefore optimize the efficiency of handovers in the network.

As mentioned previously, the systems and techniques described herein can be used to provide service continuity for UE services that require or are associated with a specific network slice. In one illustrative example, the systems and techniques can be used to provide service continuity during Intra-Registration Area (Intra-RA) mobility events of a UE and Inter-Registration Area (Inter-RA) mobility events of a UE. In particular, the systems and techniques can be used to signal or otherwise inform a UE of nearby network locations (e.g., cells or tracking areas) where a requested slice (e.g., the UE's original slice) is available, thereby allowing the UE to continue accessing services that require the UE's requested/original slice.

Figure 4:
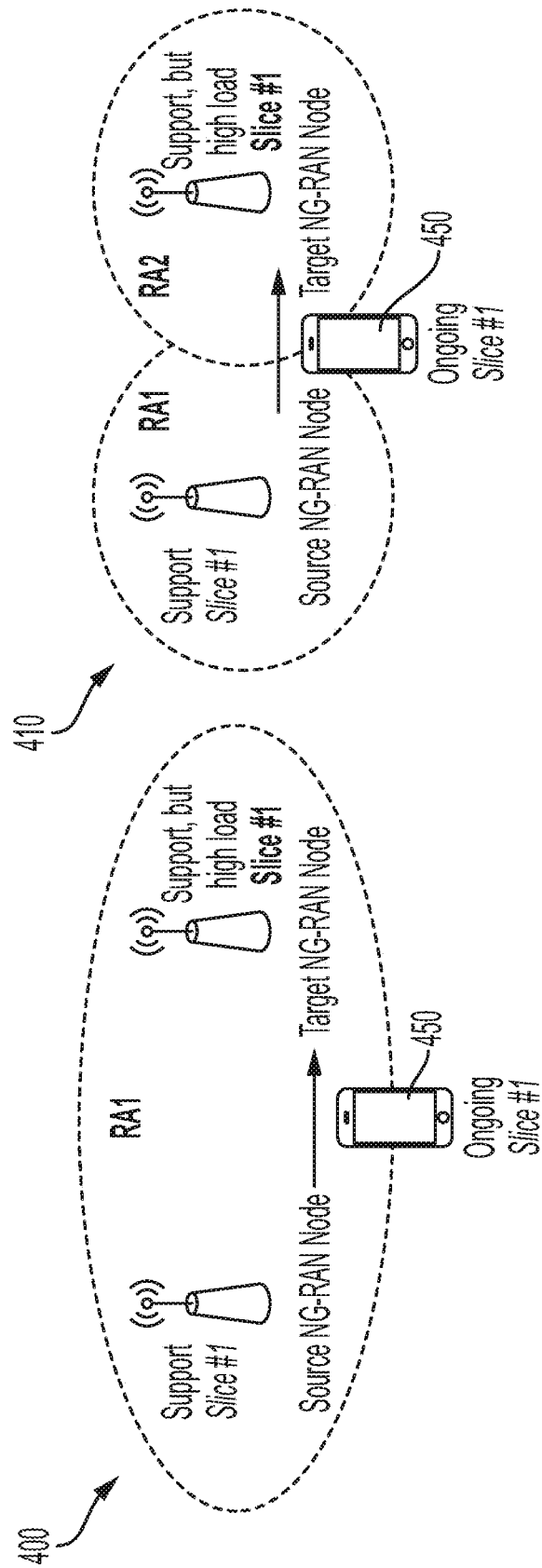
FIG. 4 illustrates an example of inter-registration area (inter-RA) mobility and intra-RA mobility, according to some aspects of the present disclosure.
Figure 6:
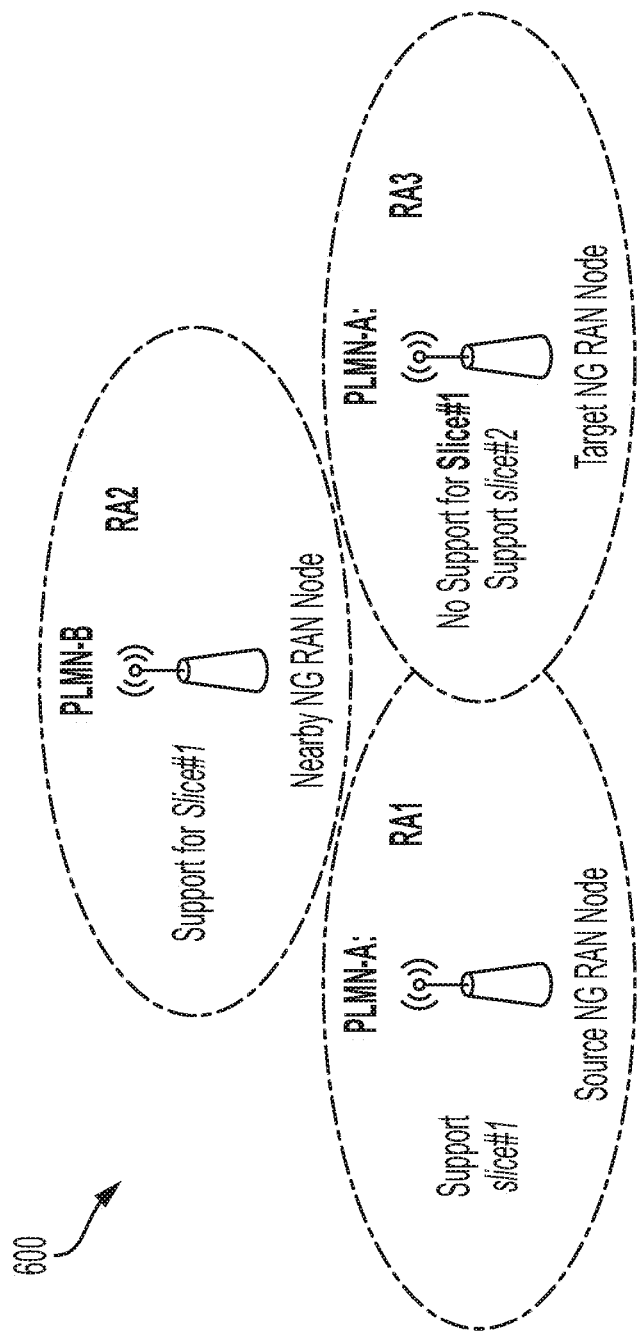
FIG. 6 is a diagram illustrating an example of UE roaming between registration areas (RAs) of a home network and a roaming network, according to some aspects of the present disclosure.

FIGS. 4-6 illustrate examples of UE mobility events in which service continuity may be disrupted for one or more network services associated with a UE (e.g., wherein the one or more network services are provided to the UE via one or more network slices).

For example, FIG. 4 is a diagram illustrating examples of network slice resource shortage associated with an Intra-RA mobility event 400 and an Inter-RA mobility event 410.

As mentioned previously, a registration area (RA) is a set of tracking areas, wherein each tracking area consists of one or more cells that cover a geographical area. For example, a cell can be associated with a network node, such as an NG-RAN node. UEs may be assigned to a given RA by an Access and Mobility Management Function (AMF), for example at the time when the UE registers with the AMF.

As illustrated in FIG. 4, a UE 450 is initially located within a first registration area RA1 (e.g., in both the example Intra-RA mobility event 400 and the example Inter-RA mobility event 410). The first registration area RA1 can be included in a wireless communications network such as a 5G network, which is not shown for purposes of clarity of illustration. Initially, UE 450 performs wireless communications with a source NG-RAN node included in RA1, using Slice 1. For example, UE 450 may utilize a network service that requires or is otherwise associated with Slice 1. In some embodiments, a UE's ongoing slice can be identified by a S-NSSAI (Network Slice Selection Assistance Information) associated with the ongoing slice. For example, although not illustrated, Slice 1 can be identified by S-NSSAI 1.

In the context of the example Intra-RA mobility event 400, a network slice resource shortage can occur when UE 450 has an ongoing slice (e.g., Slice 1, identified by S-NSSAI 1) that is supported by both a source NG-RAN node and a target NG-RAN node included in the same RA (e.g., RA1), but the target NG-RAN node fails to accept the handover of UE 450 due to high load on the UE's ongoing at the target NG-RAN node A network slice resource shortage can occur in a similar manner in the context of the example Inter-RA mobility event 410, in which UE 450 is initially connected to Slice 1 of a source NG-RAN node located in RA1, and subsequently initiates a handover to Slice 1 of a target NG-RAN node located in RA2. As described above, in the context of the example Inter-RA mobility event 410, a network slice resource shortage can occur when the target NG-RAN node in RA2 fails to accept the handover of UE 450 due to a high load on Slice 1 (e.g., the ongoing slice of UE 450) at the target NG-RAN node.

In both the example network slice resource shortage associated with Intra-RA mobility event 400 and the example network slice resource shortage associated with Inter-RA mobility event 410, the network service(s) provided to UE 450 over Slice 1 (e.g., provided over the UE's ongoing slice(s)) will be interrupted for UE 450 at the time of the failed handover to the target NG-RAN node.

In another illustrative example, a UE may experience a disruption to network service continuity in Intra-RA mobility events in which the UE moves from (e.g., undergoes a handover from) a source NG-RAN node that supports the UE's ongoing slice to a target NG-RAN node that does not support the UE's ongoing slice. For example, FIG. 5A is a diagram depicting an example Inter-RA mobility event 500a in which a UE 550 experiences a disruption to network service continuity based on UE 550 moving from a first registration area RA1 (and source NG-RAN node) that supports the UE's ongoing Slice 1 (e.g., identified by S-NSSAI 1) to a second registration area RA2 (and target NG-RAN node) that do not support the UE's ongoing Slice 1.

In some examples, a UE may move towards or to a different registration area that does not support the UE's ongoing slice (e.g., Slice 1/S-NSSAI 1) when the registration areas are associated with one or more service level agreements (SLA). For example, in the context of FIG. 5A, the depicted example scenario 500a may occur when one or more SLAs require the UE's ongoing slice 1 to be available within one or more specific geographic areas. For example, an SLA may require slice 1 (e.g., identified by S-NSSAI 1) to be available within RA1. In some cases, the SLA may additionally require that services used on the original slice must have service continuity if the UE moves outside of the specified geographic area. For example, the SLA may additionally require that services used on Slice 1 have service continuity if UE 550 moves outside of RA1.

In the example described above, the SLA would not be met when UE 550 moves from RA1 to RA2, as the target NG-RAN node and RA2 do not support the UE's ongoing Slice 1. Accordingly, service continuity on Slice 1 would be broken at the time of the handover of UE 550 from source NG-RAN node in RA1 to target NG-RAN node in RA2.

In existing approaches to network slicing, UE 550 may have to cease its movement into or towards RA2 and reverse course (e.g., return back to RA1) in order to maintain service continuity on Slice 1. This can be undesirable due to the restrictions that may be placed on the movement and/or travel of UE 550 while wishing to utilize network services, and maintain service continuity thereof, on Slice 1. For example, FIG. 5B is a diagram 500b that in some embodiments can depict a continuation scenario of FIG. 5A, in which a UE moves back for a non-supported slice during Inter-RA mobility events. For example, as illustrated, at the time of handover, the source node may serve the UE 550 with at least one of the slices (e.g., identified by S-NSSAI) not supported by the target node. The UE 550 is depicted moving towards a registration area (e.g., RA1) that supports at least one of the UE's ongoing slices.

In another illustrative example, a UE can experience a service continuity interruption based on the UE preferentially moving from a first registration area in the UE's home network to a second registration area also in the UE's home network, wherein the second registration area does not support the UE's ongoing slice. For example, FIG. 6 is a diagram 600 depicting an example of a first registration area RA1 and a third registration area RA3 that are both included in a UE's home network (e.g., PLMN-A), and a second registration area RA2 that is included in a roaming partner network (e.g., PLMN-B).

In one example, a UE in its home network (e.g., PLMN-A) may initially utilize one or more network services of Slice 1 in RA1. For instance, the UE can connect to the source NG-RAN node included in RA1 of PLMN-A, as illustrated in FIG. 6. Subsequently, the UE may move to a new registration area, RA3, that is also located in the UE's home network, PLMN-A. However, RA3 does not support the UE's ongoing Slice 1, as depicted in FIG. 6; accordingly, the UE moving from RA1 to RA3 within PLMN-A will result in a service continuity interruption to the network service(s) provided to the UE over Slice 1.

However, one or more nearby slices may support the UE's ongoing Slice 1, while also being within a sufficiently close proximity to (or overlapping with) the UE's original registration area, RA1, such that a service continuity interruption would not occur if the UE were to instead move from RA1 to the nearby slice that supports the UE's ongoing Slice 1. For example, FIG. 6 further depicts registration area RA2 of a roaming partner network PLMN-B that does support the UE's ongoing Slice 1. Additionally, RA2 is sufficiently close to RA1 for a handover to occur between the source NG-RAN node of RA1, PLMN-A and the nearby NG-RAN node of RA2, PLMN-B without causing a service continuity interruption to the UE. It would be desirable to provide systems and techniques for the UE to move to nearby registration areas (RAs), tracking areas (TAs), and/or other geographic areas in which a UE's ongoing or requested slice is available, even if the nearby RA is included in a different wireless network, associated with a different relative position and/or heading relative to the UE's current RA, etc.

As mentioned previously, the availability of a given slice in a network. (e.g., a 5G network, 4G network, etc.) can be based on the location of the UE within the network. For example, slice availability can depend on a UE's current RA and/or TA—in order for a UE to utilize services provided by a given S-NSSAI, the UE is required to be present in a TA where the requested S-NSSAI is available.

When a requested slice (e.g., requested S-NSSAI) is not available for the UE's current location, the network AMF can respond to a UE connection request with a reject code ' 5-NSSAI not available in the current registration area' for individually requested slices that are unavailable, while one or more other slices requested by the UE are available. In some examples, the aforementioned reject code can be included in a Registration Accept message transmitted from the AMF to the UE. In another example, the network AMF can respond to a UE connection request with a reject code 'No network slices available' included in a Registration Reject message when all of the requested slices/S-NSSAIs identified by the UE are unavailable/unsupported in the registration area.

In the examples described above with respect to FIGS. 4-6, one or more service continuity interruptions can occur when a UE experiences a handover (HO) event during either inter-RA mobility and/or intra-RA mobility events, wherein the UE moves from a source node that supports the UE's ongoing/requested S-NSSAI to a target node that does not support the UE's ongoing/requested S-NSSAI. In particular, during handover, if the target node does not support the slice on which a UE currently has a PDU session established, then the handover event will cause the PDU session to be released by the network (e.g., thereby interrupting service continuity of any services provided to the UE via the ongoing slice).

When a requested S-NSSAI is unavailable or unsupported in a first target RA or TA to which the UE moves, it may be likely that the requested S-NSSAI is available at one or more different, nearby locations. This may be due to the fact that network slices require dedicated RAN resources, which not all registration areas (RAs) may be able to support (e.g., due to the expense or implementation complexity). Based on the RAN resources required to support network slices in each RA/TA, it is often not feasible for a network to implement uniform support of slices in all of the geographical locations (e.g., RAs, TAs) of the network. The non-uniform support of slices across different RAs and TAs of a given network can result in the denial of network services, including some critical network services, to one or more UEs during mobility and/or handover events (e.g., as described above with respect to the examples of FIGS. 4-6).

As such, if a UE is utilizing a service on a given slice within a first tracking area (e.g., the cell associated with a first NG-RAN node), the service continuity to the UE will be interrupted if the UE is handed over to a second tracking area (e.g., the cell associated with a second NG-RAN node) that does not support the same given slice. As such, during handover of a UE, if the target location does not support the slice on which the UE currently has a PDU session established, the PDU session will be released by the network. This can result in the denial of some critical services to a UE during Inter-RA mobility events and/or Intra-RA mobility events (e.g., whenever the UE experiences a handover between different tracking areas or cells).

For example, a UE might be at a specific location, such as a hospital, where the UE is using an Ultra-Reliable Low Latency Communication (URLLC) slice. If the UE moves to another location where the URLLC slice is unavailable (or unsupported), a UE session utilizing one or more URLLC services will be released. This can be undesirable for a variety of reasons, including the existence of Service Level Agreements (SLAs) specifying that services used on a UE's original slice are required to have continuity if the UE moves outside of the geographic area associated with the original slice.

The present technology includes systems, methods, and computer-readable media (also referred to as "systems and techniques") for solving these problems and discrepancies. For example, the systems and techniques can be used to inform a UE of nearby geographical locations (e.g., coordinates, RA identifier, TA identifier, etc.) where a UE's requested slice (e.g., identified by S-NSSAI) is available. For example, the systems and techniques can inform a UE of nearby RAs or TAs where the requested S-NSSAI is available, based on the fact that existing mechanisms and/or existing UEs are unable to provide UE-level intelligence or awareness of the mapping between slice support and geographic location(s). In some aspects, based on the location information provided to the UE, the UE can move a location where the requested S-NSSAI remains available, thereby enabling the UE to continue accessing network service(s) on the requested S-NSSAI without any interruption to service continuity.

Figure 7:
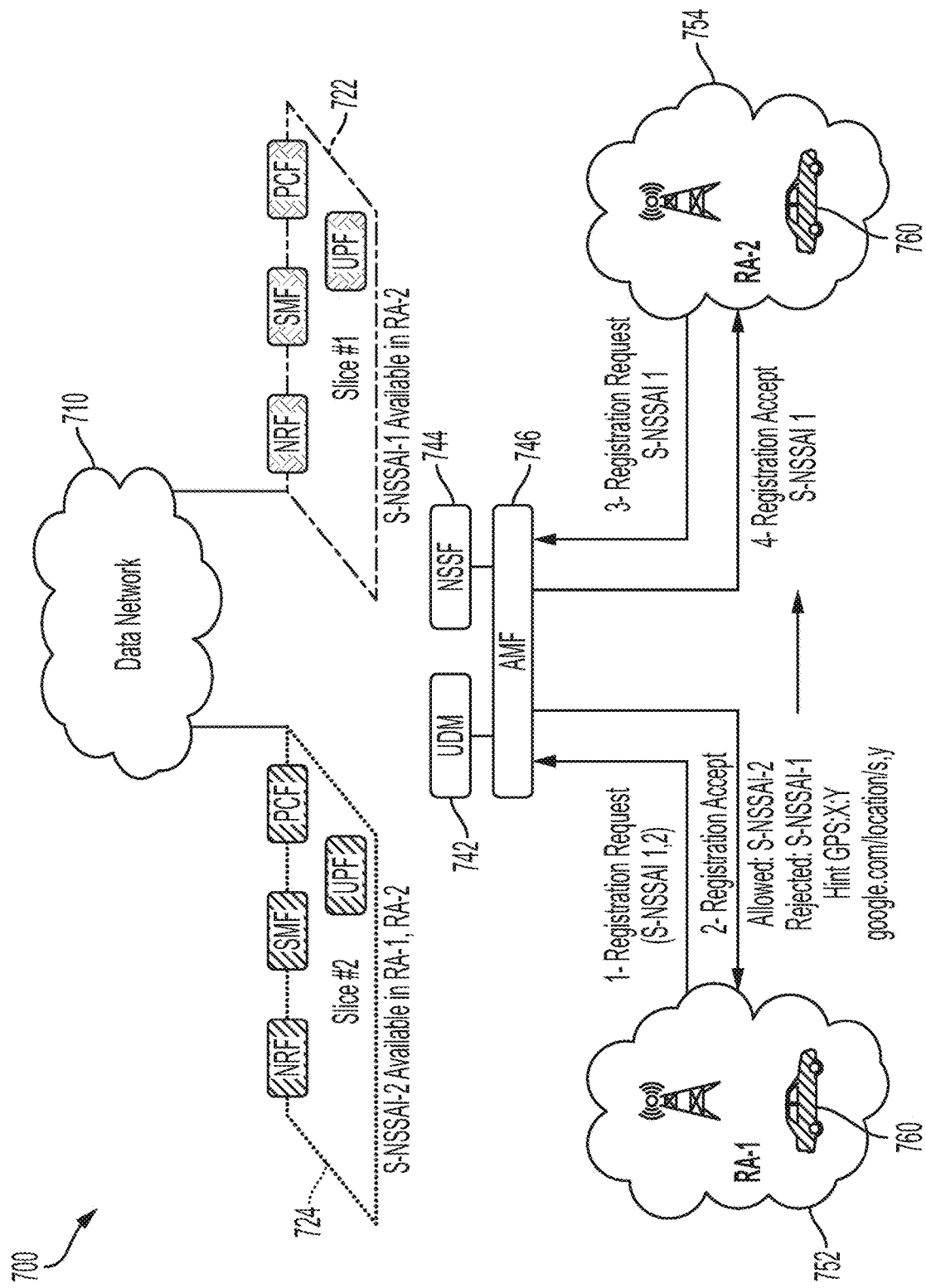
FIG. 7 is a diagram illustrating an example network architecture in which aspects of the present disclosure may be implemented.

FIG. 7 is a diagram illustrating an example network 700 for steering a UE to a nearby geographical location that provides support for the UE's requested slice (e.g., that provides support for the UE's requested S-NSSAI). In some aspects, the systems and techniques described herein can be used to inform a UE about nearby network locations (e.g., cells, RAs, TAs, etc.) where a requested S-NSSAI is available, thereby enabling the UE to continue accessing services that require the requested S-NSSAI. In some embodiments, the requested S-NSSAI can identify or otherwise be associated with an ongoing or current slice of the UE, such that a location hint provided to the UE enables the UE to maintain service continuity on its ongoing or current slice (e.g., based on steering, during UE mobility events, the UE to a nearby location that supports the ongoing or current slice).

In some embodiments, a UE can be provided with a location hint (e.g., a GPS location or similar geotagged location) such that the UE can move to the nearest location that falls within a RA where the UE's requested slice is available. As mentioned previously, in some embodiments it is contemplated that a UE's requested slice can be identified based on the S-NSSAI (Network Slice Selection Assistance Information) of the slice.

In one illustrative example, location hint information can be provided to a UE in response to a determination that the UE's current location (e.g., current cell, RA, or TA) does not support the UE's requested S-NSSAI (e.g., the requested S-NSSAI is unsupported at the time of registration). Further aspects of the example in which a UE's requested S-NSSAI is unsupported at the time of registration are described below with respect to FIGS. 7 and 8.

In another illustrative example, location hint information can be provided to a UE in response to a determination that the UE is undergoing a handover or mobility event (e.g., from a current location to a target location), and the target location does not support the UE's requested S-NSSAI (e.g., the requested S-NSSAI is unsupported at handover). Further aspects of the example in which a UE's requested S-NSSAI is unsupported at the time of handover are described below with respect to FIGS. 9A and 9B.

Turning first to FIG. 7, illustrated is an example network 700 including a data network 710, a first slice 722 (e.g., associated with or identified by S-NSSAI-1), a second slice 724 (e.g., associated with or identified by S-NSSAI-2), a first registration area 752 (e.g., RA1), and a second registration area 754 (e.g., RA2). In some examples, the first registration area 752 supports second slice 724 and does not support first slice 722; the second registration area 754 supports both first slice 722 and second slice 724.

Also depicted are example network components/functions that can be included in the example network 700 and used to implement the systems and techniques described herein: Unified Data Management (UDM) 742, Network Slice Selection Function (NSSF) 744, and Access and Mobility Management Function (AMF) 746.

In one illustrative example, a UE 760 can initially be located in the first registration area 752 (e.g., RA1), which supports second slice 724 (e.g., S-NSSAI 2) and does not support first slice 722 (e.g., S-NSSAI 1). In a first step, UE 760 can generate and transmit a Registration Request message to AMF 746, wherein the Registration Request message includes a registration request for S-NSSAI 1 and S-NSSAI 2 within RA1.

In a second step, AMF 746 can generate a Registration Accept message that includes a partial acceptance of the UE's Registration Request from step 1. For example, AMF 746 can generate a Registration Accept message that includes an Allowed registration for S-NSSAI 2 (e.g., the second slice 724, which is supported by RA1) and a Rejected registration for S-NSSAI 1 (e.g., the first slice 722, which is not supported by RA1).

In some embodiments, AMF 746 can use the systems and techniques described herein to generate the Registration Accept message to further include a location hint indicating a geographical location where the Rejected slice (e.g., S-NSSAI 1) requested by the UE would be supported. As illustrated in FIG. 7, the location hint can comprise a GPS location hint or other location information indicating geographical coordinates where the Rejected slice S-NSSAI 1 requested by UE 760 would be supported. Further details of the location hint information and partial Registration Accept message generated by the AMF 746 will be described below with respect to FIGS. 8A-B.

Returning to the discussion of FIG. 7, in a third step, UE 760 can use the location hint information provided by AMF 746 and move to the indicated geographical location (and/or cell, RA, TA, etc.) determined by AMF 746 as supporting the UE's requested slice for which registration was rejected in RA1. In particular, UE 760 can use the GPS coordinate provided by AMF 746 as the location hint information and move to the specified GPS coordinate. As illustrated, the specified GPS coordinate corresponds to a location within second registration area 754 (e.g., RA2). Once located within RA2, UE 760 can generate and transmit a Registration Request message to AMF 746, wherein the Registration Request message includes a registration request for S-NSSAI 1 (e.g., the unsupported slice from RA1, for which the location hint was generated in step 2 by AMF 746).

Because RA2 supports S-NSSAI 1, in a fourth step, AMF 746 can generate in response a Registration Accept message accepting (e.g., allowing) the UE's registration request for S-NSSAI 1 in RA2, thereby avoiding a service continuity interruption on S-NSSAI 1, as may occur if UE 760 were to remain at its original location in RA1, where S-NSSAI 1 is not supported.

In some embodiments, AMF 746 can determine and transmit location hint information in response to a UE Registration Request message based on determining that a location hint (or location hint preference) is enabled in a subscription profile associated with the UE. In some aspects, the UE subscription profile(s) can be associated with specific S-NSSAI(s) and/or can enable location hint for one or more specified S-NSSAIs. In some embodiments, a UE may additionally, or alternatively, indicate to the network (e.g., network 700) while requesting S-NSSAI whether the UE requires location hint information if the requested S-NSSAI is unsupported for the UE's current location (e.g., current RA or TA). In some aspects, as a UE continues to move through or otherwise traverse a network (e.g., network 700), the UE can build a local data store mapping slice availability information to various geographic locations, RAs, and/or TAs. Based on the locally stored mapping of slice availability information to geographic locations, in some embodiments a UE may determine one or more location hints locally, such that the UE can move to a RA or TA that supports the UE's requested S-NSSAI without the UE having to request the location hint information from the network (e.g., from AMF 746).

In some embodiments, a UE may maintain a local mapping of slice availability information and geographical locations, wherein the network may change and/or update the mapping(s) between various S-NSSAIs and geographic locations dynamically. In some aspects, when the network changes one or more S-NSSAI and geographic location mappings, the network can transmit the update to one or more UEs, such that the one or more UEs can update their local mappings. In some aspects, when the network changes one or more S-NSSAI and geographic location mappings, the UE may not be informed of the update, and the UE will update its locally maintained mapping of S-NSSAI to geographic location mappings as the UE continues to move through or otherwise traverse the network.

In some embodiments, the network (e.g., network 700) may be aware of the topology of the constituent TAs included in the network, and may also be aware of the supported S-NSSAI for some (or all) of the constituent TAs included in the network. Accordingly, in some embodiments, the network can select or otherwise determine a closest TA (e.g., based on TAI) that supports a UE's requested S-NSSAI. For example, the network can select or determine the closest TA in response to a determination that a location hint is required for a Registration Request message received from a UE, e.g., when the Registration Request includes requests for one or more S-NSSAIs that are unsupported in the UEs current location. The network can subsequently query an operator-controlled location AF to obtain the location Uniform Resource Indicator (URI) of the appropriate TA.

Figure 8A:
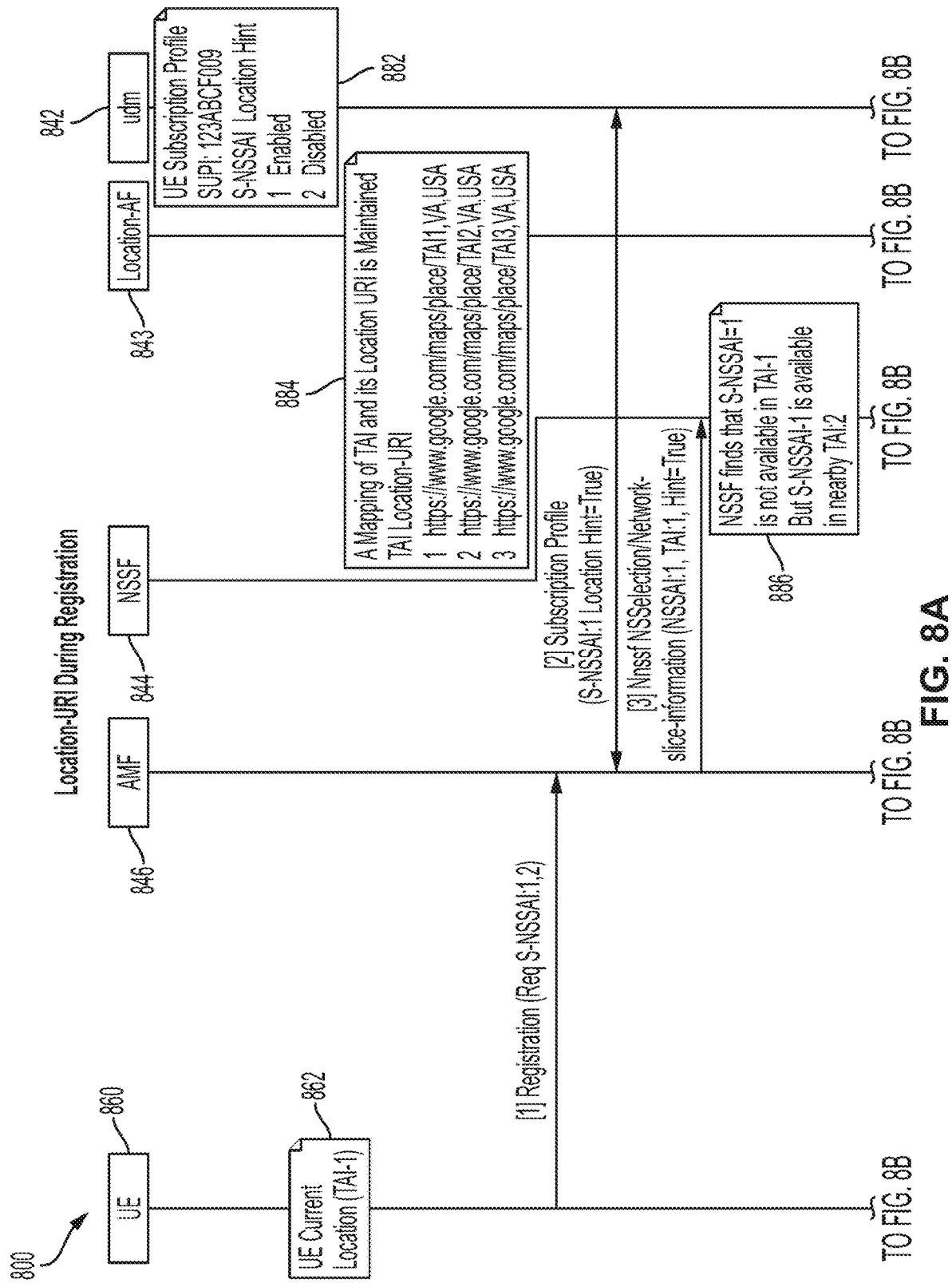
FIGS. 8A and 8B are diagrams illustrating an example network flow for providing a UE with location hint information during a slice registration process, according to aspects of the present disclosure.
Figure 8B:
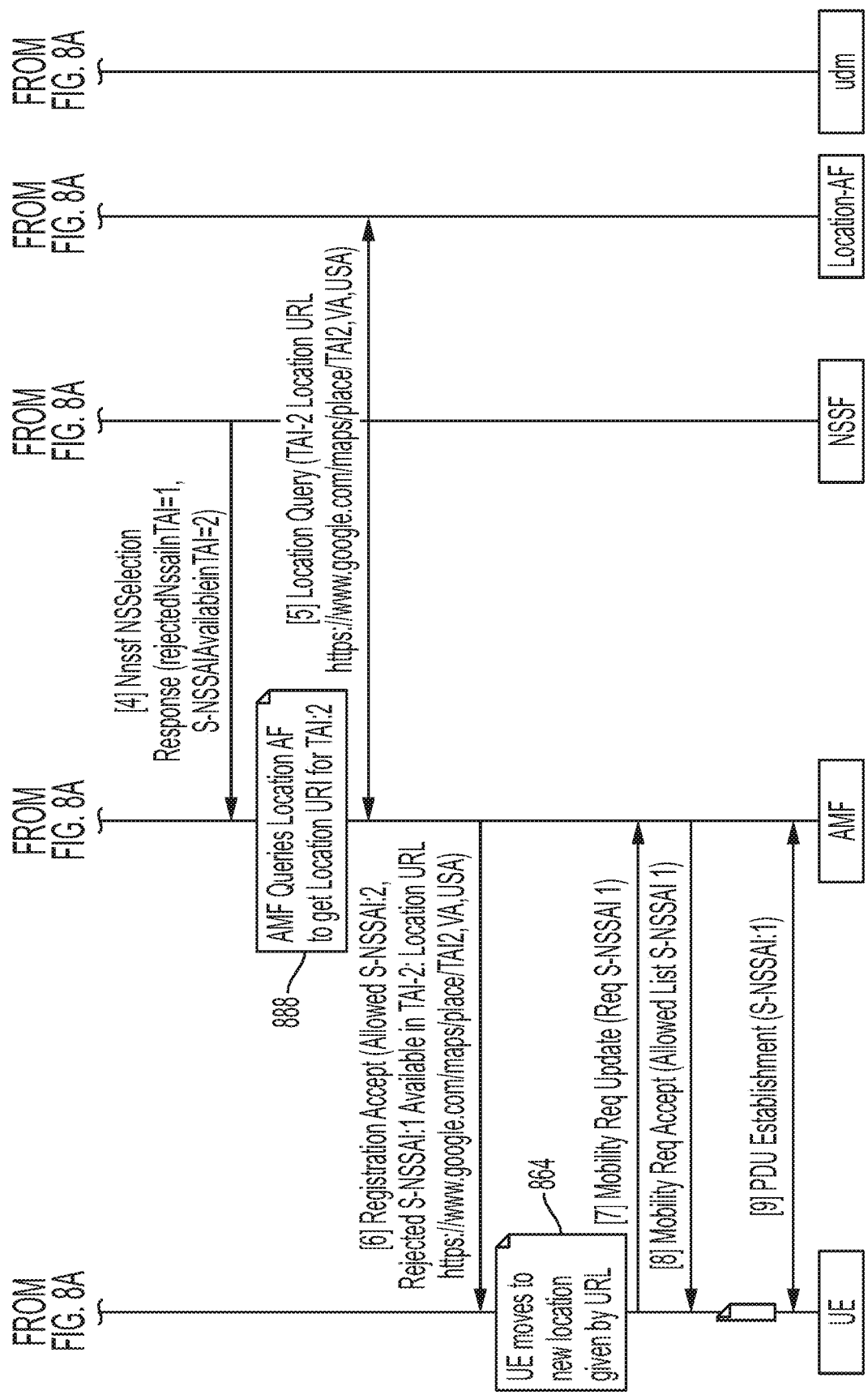

FIGS. 8A and 8B depict a call flow diagram 800 illustrating an example process for providing location information or a location URI (e.g., a location hint) to a UE. For example, the location information can be provided to a UE 860 in response to receiving a registration request from the UE that includes a request for one or more slices (e.g., identified by S-NSSAI) that are not supported in the UEs current RA or TA. As illustrated, FIGS. 8A-B include a UE 860, an AMF 846, an NSSF 844, a Location AF 843, and a UDM 842. In some embodiments, UE 860 can be the same as or similar to UE 760, AMF 846 can be the same as or similar to AMF 746, NSSF 844 can be the same as or similar to NSSF 744, and/or UDM 842 can be the same as or similar to UDM 742.

UDM 842 includes a UE subscription profile 882 that can include a listing of one or more S-NSSAIs for which location hints are either enabled or disabled. For example, an S-NSSAI with location hint enabled in UE subscription profile 882 can indicate that the UE requests location hints if the UE transmits a registration request for the S-NSSAI in an RA or TA where the S-NSSAI is unsupported. An S-NSSAI with location hint disabled in UE subscription profile 882 can indicate that the UE does not wish to receive a location hint if the UE transmits a registration request for the S-NSSAI in an RA or TA where the S-NSSAI is unsupported.

Location AF 843 can include and/or otherwise maintain a mapping 884 between TAs and their corresponding location URIs. For example, the location URIs can be links to online mapping services, GPS coordinates, etc. As illustrated, the TAs can be stored in the mapping 884 using the corresponding Tracking Area Identity (TAI) for each respective TA.

At step (1), depicted in FIG. 8A, the UE 860 can be associated with a current UE location 862, shown here as a location within TAI-1. While located at the current UE location 862 within TAI-1, UE 860 generates and transmits a Registration Request to AMF 846, requesting registration for a first slice identified by S-NSSAI-1 and requesting registration for a second slice identified by S-NSSAI-2.

At step (2), depicted in FIG. 8A, AMF 846 can communicate with UDM 842 to compare the requested S-NSSAIs from the UE registration request (e.g., received at AMF 846 in step (1)) to the UE subscription profile 882 stored in UDM 842. In one illustrative example, AMF 846 can determine whether location hint is enabled for each of the requested S-NSSAIs, based on the enabled/disabled information stored in the UE subscription profile 882 for each requested S-NSSAI. As illustrated, UDM 842 can transmit a response to AMF 846 indicating that Location Hint=True for S-NSSAI-1. The lack of any information corresponding to S-NSSAI-2 in the response from UDM 842 to AMF 846 can indicate that Location Hint=False for S-NSSAI-2 (e.g., S-NSSAIs with Location Hint disabled can be communicated implicitly to AMF 846).

At step (3), depicted in FIG. 8A, AMF 846 communicates with NSSF 844 to determine whether S-NSSAI-1 is available at the UE's current location 862 (e.g., TA-1). AMF 846 can additionally communicate to NSSF 844 an indication that Location Hint=True that is associated with the requested slice support information for S-NSSAI-1 in TA-1. In response, at 886, NSSF 844 can determine that S-NSSAI-1 is not available (e.g., not supported) in TAI-1.

Because AMF 846 indicated to NSSF 844 that Location Hint=True for the requested slice availability information of S-NSSAI-1 in TAI-1, NSSF 844 can additionally determine one or more nearby TAIs where the requested S-NSSAI-1 is available/supported. In some embodiments, the requested S-NSSAI-1 may be supported in multiple nearby TAIs, in which case NSSF 844 can determine and provide in response only the nearby TAI supporting S-NSSAI-1 that is closest to the current UE location 862. In some aspects, NSSF 844 can provide in response some (or all) of the nearby TAIs that were identified as supporting S-NSSAI-1, in either a ranked or unranked order.

In step (4), depicted in FIG. 8B, NSSF 844 provides an NSSF Selection Response to AMF 846. The NSSF Selection Response can include the nearby TAI information 886 determined based on the UE's requested S-NSSAI that is not supported for the UE's current location 862. For example, as illustrated, the NSSF Selection Response can indicate or include a rejection for S-NSSAI-1 in TAI-1 and an indication that S-NSSAI-1 is available in nearby TAI-2.

In step (5), depicted in FIG. 8B, based on receiving from NSSF 844 the indication that S-NSSAI-1 is available in nearby TAI-2, AMF 846 can query Location AF 843 to obtain a corresponding Location URI for TAI-2 (e.g., as depicted in FIG. 8B at 888). In response to receiving the location query for TAI-2 from AMF 846, Location AF 843 can generate and transmit a response (e.g., to AMF 846) that includes location information of TAI-2. As illustrated in FIG. 8B, Location AF 843 generates and transmits a response to AMF 846 that includes a location URL associated with TAI-2.

At step (6), depicted in FIG. 8B, after receiving the location information of TA-2 from Location AF 843, AMF 846 can generate and transmit a Registration Accept message to UE 860 (e.g., in response to the Registration Request message received from UE 860 in step (1)). In some embodiments, AMF 846 transmits a partial Registration Accept message to UE 860, that includes a registration Allowed indication for S-NSSAI-2 in TAI-1 (e.g., the UE's current location 862) and a registration Rejected indication for S-NSSAI-1 in TAI-1. In one illustrative example, AMF 846 can additionally generate the partial Registration Accept message to include location hint information for the rejected S-NSSAI-1. The location hint information can be included based on the Location Hint being enabled in the UE subscription profile 882 located at UDM 842, as described above. In some aspects, the location hint information included in the partial Registration Accept message transmitted by AMF 846 in step (6) can be the same as the location information received by AMF 846 from Location AF 843 in step (5), as described above. For example, the partial Registration Accept message can include an indication that the UE's request for S-NSSAI-1 in TAI-1 is rejected, but that the requested S-NSSAI-1 is available in TAI-2 (e.g., and further including the location hint information/location URL for TAI-2).

Based on receiving the location hint information (e.g., location URL) for TAI-2 in the partial Registration Accept message received by UE 860 from AMF 846, the UE 860 can physically move to the new location given by or otherwise associated with the location hint information/location URL provided by AMF 846 in the partial Registration Accept message. In FIG. 8B, the UE movement to TAI-2 based on the location hint information is indicated at 864.

At step (7), depicted in FIG. 8B, after moving to TAI-2 based on the location hint information provided by AMF 846, UE 860 can transmit a Mobility Registration Update to AMF 846, with a request for S-NSSAI-1 in TAI-2.

At step (8), depicted in FIG. 8B, the AMF 846 can generate and transmit in response to UE 860 a Mobility Registration Accept message, wherein the Mobility Registration Accept message includes an Allowed List with S-NSSAI-1, e.g., indicating that the UE 860 request to register S-NSSAI-1 in TAI-2 was allowed.

Subsequently, in step (9), depicted in FIG. 8B, PDU establishment on S-NSSAI-1 in TAI-2 can be performed between UE 860 and AMF 846.

Figure 9A:
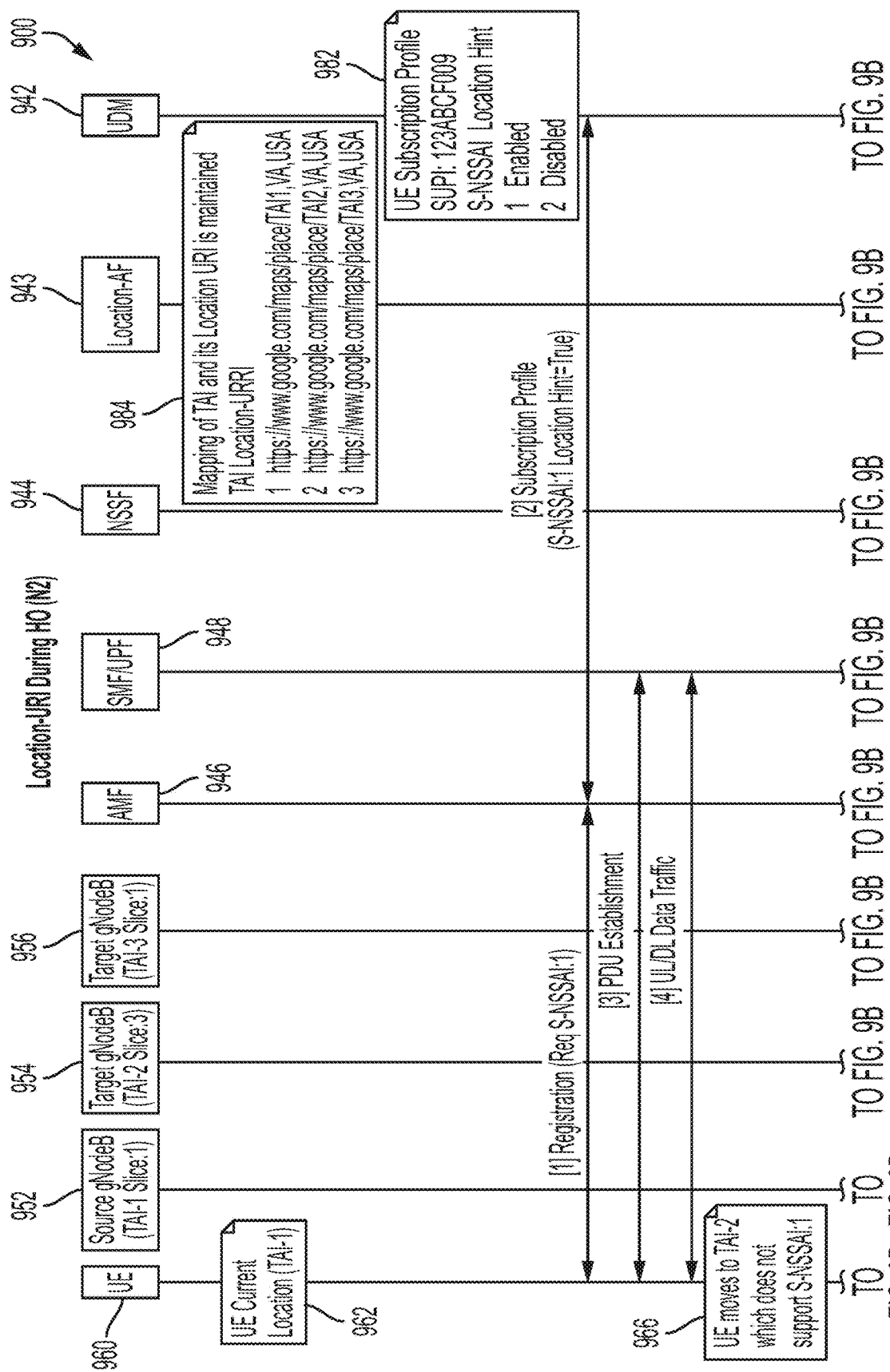
FIGS. 9A and 9B are diagrams illustrating an example network flow for providing a UE with location hint information during a handover (HO) event, according to aspects of the present disclosure.
Figure 9B:
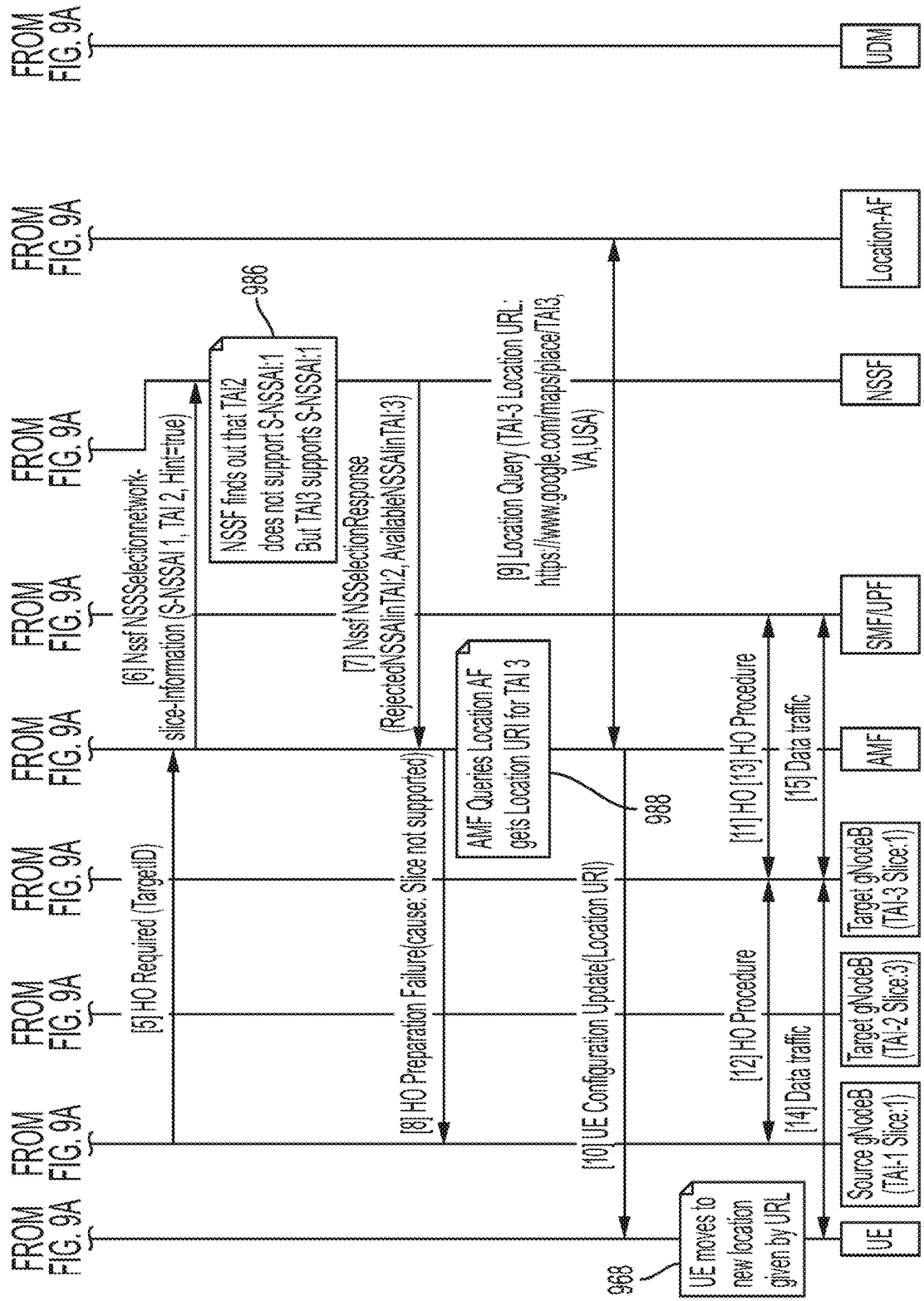

In another illustrative example, the systems and techniques can be used to provide location information (e.g., location hint information) in response to determining that a target location associated with a UE handover (HO) does not support a requested and/or ongoing S-NSSAI (e.g., slice) associated with a network service utilized by the UE. For example, FIGS. 9A and 9B depict a call flow diagram 900 illustrating an example process for providing location information (e.g., or a location hint) to a UE during a handover of the UE. As illustrated, FIGS. 9A and 9B include a UE 960 (e.g., which can be the same as one or more of the UEs 760 and 860), an AMF 946 (e.g., which can be the same as one or more of the AMFs 746 and 846), an NSSF 944 (e.g., which can be the same as one or more of the NSSFs 744 and 844), a Location AF 943 (e.g., which can be the same as one or more of the Location AFs 743 and 843), and a UDM 942 (e.g., which can be the same as one or more of the UDMs 742 and 842).

Also illustrated are a source gNodeB (gNB) 952 located in TAI-1 and supporting Slice 1 (e.g., supporting S-TSSAI-1), a target gNB 954 located in TAI-2 and supporting Slice 3 (e.g., supporting S-TSSAI-3), and a target gNB 956 (e.g., located in TAI-3 and supporting Slice 1 (e.g., supporting S-TSSAI-1). FIGS. 9A and 9B further depict a Session Management Function/User Plane Function (SMF/UPF) 948.

UDM 942 includes a UE subscription profile 982, which can be the same as or similar to the UE subscription profile 882 described above. Location AF 943 includes a mapping 984 of TAI and location information (e.g., location URI) 984, which can be the same as or similar to the mapping 884 described above.

At step (1), depicted in FIG. 9A, UE 960 is initially located at a current UE location 962 within TAI-1. UE 960 submits a Registration Request for S-NSSAI-1 in TAI-1 to AMF 946 (e.g., as described above with respect to step (1) of FIG. 8A).

At step (2), depicted in FIG. 9A, AMF 946 communicates with UDM 942 to compare the received/requested S-NSSAI-1 with the UE subscription profile 982 and determines that Location Hint=True for S-NSSAI-1 (e.g., as described above with respect to step (2) of FIG. 8A).

At step (3), depicted in FIG. 9A, PDU establishment is performed between UE 960 and SMF/UPF 948, establishing a PDU session for S-NSSAI-1 in TAI-1 (e.g., because S-NSSAI-1 is supported in TAI-1).

At step (4), depicted in FIG. 9A, UE 960 can utilize one or more network services that require S-NSSAI-1, via the PDU session established in step (3). As illustrated, UL/DL wireless communications can be exchanged between UE 960 and SMF/UPF 948, using the PDU session established on S-NSSAI-1 in TAI-1.

Subsequently, at 966, the UE 960 moves from TAI-1 (e.g., which supports S-NSSAI-1) to TAI-2, which does not support S-NSSAI-1. Accordingly, at step (5), depicted in FIG. 9B, the source gNB 952 (e.g., located in TAI-1 and supporting the UE 960 PDU session on S-NSSAI-1) transmits a Handover (HO) Required message to AMF 946. In some embodiments, the HO Required message can include a TargetID corresponding to the current or ongoing slice of the UE 960 (e.g., TargetID=S-NSSAI-1).

At step (6), depicted in FIG. 9B, AMF 946 can communicate with NSSF 944 to determine whether the requested slice S-NSSAI-1 is available in TAI-2. AMF 946 can additionally communicate with NSSF 944 to indicate that Location Hint=true for UE 960's request for S-NSSAI-1 in TAI-2. In some embodiments, the communication between AMF 946 and NSSF 944 can be the same as or similar to the communication between AMF 846 and NSSF 844 described above with respect to step (4) of FIG. 8B.

At 986, NS SF 944 determines that TAI-2 does not support the requested slice S-NSSAI-1, but can further determine that the nearby TAI-3 does support the requested slice S-NSSAI-1. In some embodiments, the determination 986 of nearby TAIs supporting the requested slice can be the same as or similar to the determination 886 of nearby TAIs as described above with respect to FIG. 8A.

At step (7), depicted in FIG. 9B, NSSF 944 generates and transmits to AMF 946 an NSSF Response indicating that the UE's requested S-NSSAI-1 in TAI-2 is rejected, but that the requested S-NSSAI-1 is supported/available in the nearby TAI-3. In some embodiments, step (7) of call flow 900 can be the same as or similar to step (4) of call flow 800, as described above.

At step (8), depicted in FIG. 9B, AMF 946 can transmit a HO Preparation Failure message to source gNB 952, indicating a Cause=Slice not supported. For example, the HO Preparation Failure message can inform source gNB 952 that the requested HO (e.g., from step (5)) will be rejected, based on the requested S-NSSAI-1 being not supported for the requested TAI-2.

Subsequently, at 988, AMF 946 can query Location AF 943 to determine or otherwise obtain a location URI of the nearby TAI-3 that would support the UE's requested S-NSSAI-1. In some embodiments, the AMF 946 location information query 988 can be the same as or similar to the AMF 846 location information query 888 described above with respect to call flow 800 and depicted in FIG. 8B.

At step (9), depicted in FIG. 9B, Location AF 943 can receive the location information query 988 from AMF 946, determine a location URI, GPS coordinate, or other location hint information corresponding to the requested TAI-3. Location AF 943 can then transmit in response to AMF 946's request the determined location hint information. In some embodiments, step (9) can be the same as or similar to step (5), as described above with respect to FIG. 8B and the call flow 800 of FIGS. 8A and 8B.

At step (10), depicted in FIG. 9B, AMF 946 can transmit a UE Configuration Update to UE 960, wherein the UE Configuration Update includes the location hint information (e.g., Location URI) obtained by AMF 946 from Location AF 943, indicating a location of a nearby TAI (e.g., TAI-3) to which UE 960 can move to in order to maintain continuity of network functions on the requested slice S-NSSAI-1.

Based on receiving the location hint information from AMF 946 in step (10), the UE 960 can subsequently move to a new location as given by or otherwise associated with the location hint information provided by AMF 946 in the UE Configuration Update. As illustrated in FIG. 9B, the UE movement based on the location hint information from AMF 946 is depicted at 968.

At step (11), depicted in FIG. 9B, target gNB 956 located in TAI-3 and supporting the requested S-NSSAI-1 can communicate with SMF/UPF 948 to perform a HO procedure for UE 960 and its ongoing use of S-NSSAI-1 in TAI-1/via source gNB 952. At step (12), depicted in FIG. 9B, target gNB 956 in TAI-3 can further coordinate and perform the HO procedure with source gNB 952 in TAI-1. At step (13), depicted in FIG. 9B, target gNB 956 can communicate with SMF/UPF 948 to confirm or acknowledge the successful handover of the UE ongoing S-NSSAI-1 from source gNB 952 in TAI-1 to target gNB 956 in TAI-3.

At step (14), depicted in FIG. 9B, data traffic can be exchanged between UE 960 and target gNB 956 in TAI-3, using the requested and ongoing UE slice S-NSSAI-1. Accordingly, session continuity can be maintained for UE services that require S-NSSAI-1 during the UE mobility event associate with the UE 960 leaving TAI-1, e.g., based on the systems and techniques described herein being used to steer the UE 960 to the nearby TAI-3 (which also supports the ongoing slice S-NSSAI-1) rather than to TAI-2 (which does not support the ongoing slice S-NSSAI-1, and would cause a service continuity interruption). At step (15), data traffic can be exchanged between target gNB 956 in TAI-3 and SMF/UPF 948.

Figure 10:
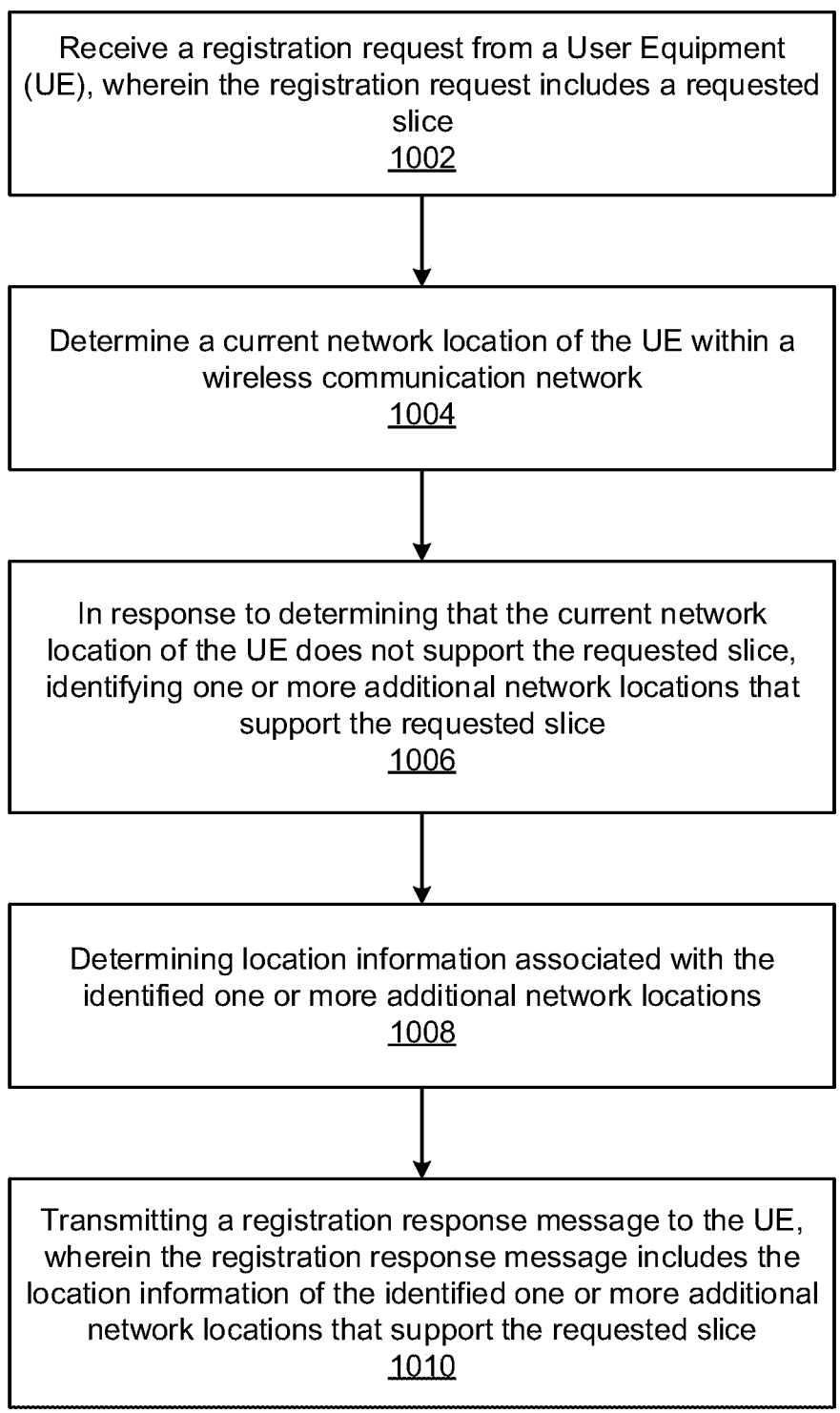
FIG. 10 illustrates an example method for providing service continuity for User Equipment (UE) services associated with certain network slices, according to some aspects of the present disclosure.

FIG. 10 illustrates a flowchart of an example method 1000 for providing service continuity for User Equipment (UE) services associated with certain network slices, based on providing one or more location hints to a UE based on a requested slice associated with the UE. FIG. 6 is described below from the perspective of an AMF (e.g., one or more of AMFs 746, 846, and/or 946). However, it is understood that example method 1000 of FIG. 10 can also be implemented using one or more processors and memories having computer-readable instructions stored thereon, which when executed by the one or more processors cause the one or more processors to perform operations including some or all of method 1000. Although method 1000 depicts a particular sequence of operations, the sequence may be altered without departing from the scope of the present disclosure. For example, some of the operations depicted may be performed in parallel or in a different sequence that does not materially affect the function of method 1000. In other examples, different components of an example device or system that implements method 1000 may perform functions at substantially the same time or in a specific sequence.

According to some embodiments, the method 1000 includes, at a step 1002 receiving a registration request from a User Equipment (UE), wherein the registration request includes a requested slice. In some examples, the requested slice can be identified by an S-NSSAI or other slice identifier. In some embodiments, the registration request can be received from the UE by an AMF.

The method 1000 further includes, at a step 1004, determining a current network location of the UE within a wireless communication network. For example, the current location of the UE can be determined as a current Tracking Area Identity (TAI) in which the UE is located, a current Registration Area (RA) in which the UE is located, or a combination of the two. In some aspects, the current TAI and/or RA can be located within or otherwise included in the wireless communication network.

The method 1000 further includes, at a step 1006, identifying, in response to determining that the current network location of the UE does not support the requested slice, one or more additional network locations that support the requested slice. For example, an AMF or NSSF can determine that the current TAI or current RA associated with the UE location does not support the requested slice identified by the UE in the registration request. In some aspects, the AMF, the NSSF, and/or a Location AF can identify one or more additional TAIs and/or one or more additional RAs included in the wireless communication network that support the UE's requested slice.

The method 1000 further includes, at a step 1008, determining location information associated with the identified one or more additional network locations. In some examples, the location information can be determined for the one or more additional TAIs and/or RAs described above. In some cases, the location information can be determined using a Location AF.

The method 1000 further includes, at a step 1010, transmitting a registration response message to the UE, wherein the registration response message includes the location information of the one or more additional TAIs or additional RAs that support the requested slice.

Figure 11:
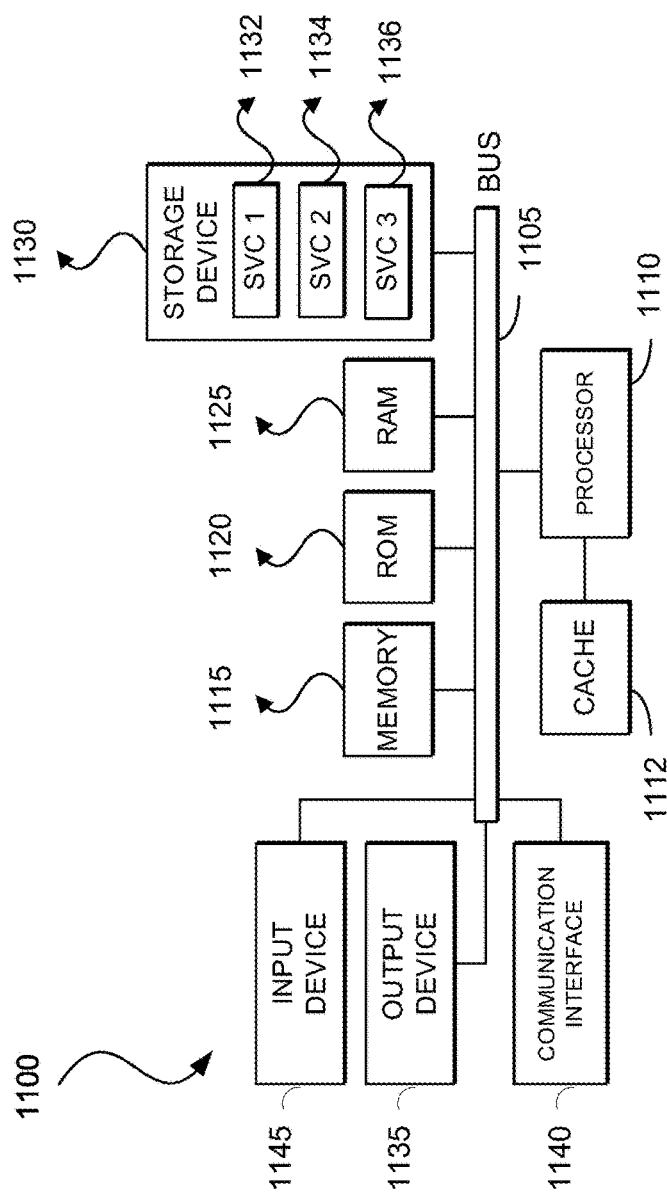
FIG. 11 illustrates an example system for implementing certain aspects of the present technology, according to some aspects of the present disclosure.

FIG. 11 illustrates a computing system architecture, according to some aspects of the present disclosure. Components of computing system architecture 1100 are in electrical communication with each other using a connection 1105. Connection 1105 can be a physical connection via a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read-only memory (ROM) 1120 and random-access memory (RAM) 1125 to processor 1110. Computing system 1100 can include a cache of high-speed memory 1112 connected directly with, in close proximity to, or integrated as part of processor 1110.

Processor 1110 can include any general-purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. There is no restriction on operating on any particular hardware arrangement, and therefore the basic features here may easily be substituted for improved hardware or firmware arrangements as they are developed.

Storage device 1130 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
   receiving a registration request from a User Equipment (UE) within a first registration area, wherein the registration request includes a first requested slice and a second requested slice;
   determining a current network location of the UE is within the first registration area;
   in response to determining that the current network location of the UE does not support the first requested slice, identifying one or more additional network locations that support the first requested slice;
   determining location information associated with the one or more additional network locations in a second registration area; and
   transmitting a registration response message to the UE, wherein the registration response message includes an acceptance of the registration request for the second requested slice, a rejection of the registration request for the first requested slice, and the location information of one or more additional Tracking Area Identities (TAIs) or additional Registration Areas (RAs) that support the first requested slice such that the UE can request registration for the first requested slice when the current network location of the UE is within the second registration area.

2. The method of claim 1, wherein the location information is determined based on transmitting a message from an Access and Mobility Management Function (AMF) to a Network Slice Selection Function (NSSF).

3. The method of claim 1, wherein the location information is a location hint comprising a Global Positioning System (GPS) location, a GPS coordinate, or a geotagged location.

4. The method of claim 1, wherein the registration request includes an identifier of each the first requested slice and the second requested slice.

5. The method of claim 4, wherein the identifier of the first requested slice and the second requested slice are respective Slice-Network Slice Selection Assistance Information (S-NSSAI).

6. The method of claim 1, wherein the current network location of the UE is determined as a current TAI or a current RA of a wireless network.

7. The method of claim 1, wherein determining that the current network location of the UE does not support the first requested slice comprises determining, based on network slice information obtained from a Network Slice Selection Function (NSSF), that a current TAI or a current RA of a wireless network does not support the first requested slice.

8. The method of claim 6, further comprising identifying, in response to determining that the current network location of the UE does not support the first requested slice, one or more additional TAIs or additional RAs that support the first requested slice.

9. The method of claim 8, wherein the one or more additional TAIs or additional RAs are associated with a nearby location relative to one or more of the current location of the UE, the current TAI, or the current RA.

10. A system comprising:
one or more processors; and
one or more computer-readable storage media having computer-readable instructions stored thereon, wherein the computer-readable instructions, when executed by the one or more processors, cause the one or more processors to:
receive a registration request from a User Equipment (UE) within a first registration area, wherein the registration request includes a first requested slice and a second requested slice;
determine a current network location of the UE is within the first registration area;
in response to determining that the current network location of the UE does not support the first requested slice, identify one or more additional network locations that support the first requested slice;
determine location information associated with the one or more additional network locations in a second registration area; and
transmit a registration response message to the UE, wherein the registration response message includes an acceptance of the registration request for the second requested slice, a rejection of the registration request for the first requested slice, and the location information of one or more additional Tracking Area Identities (TAIs) or additional Registration Areas (RAs) that support the first requested slice such that the UE can request registration for the first requested slice when the current network location of the UE is within the second registration area.

11. The system of claim 10, wherein the location information is determined based on transmitting a message from an Access and Mobility Management Function (AMF) to a Network Slice Selection Function (NSSF).

12. The system of claim 10, wherein the location information is a location hint comprising a Global Positioning System (GPS) location, a GPS coordinate, or a geotagged location.

13. The system of claim 10, wherein the registration request includes identifiers of the first requested slice and the second requested slice, wherein the identifiers each include a Slice-Network Slice Selection Assistance Information (S-NSSAI).

14. The system of claim 10, wherein the current network location of the UE is determined as a current TAI or a current RA of a wireless network.

15. The system of claim 10, wherein to determine that the current network location of the UE does not support the first requested slice, the computer-readable instructions cause the one or more processors to:
determine, based on network slice information obtained from a Network Slice Selection Function (NSSF), that a current TAI or a current RA of a wireless network does not support the first requested slice.

16. The system of claim 15, wherein the computer-readable instructions further cause the one or more processors to identify, in response to determining that the current network location of the UE does not support the first requested slice, one or more additional TAIs or additional RAs that support the first requested slice.

17. The system of claim 16, wherein the one or more additional TAIs or additional RAs are associated with a nearby location relative to one or more of the current location of the UE, the current TAI, or the current RA.

18. One or more non-transitory computer-readable media comprising computer-readable instructions, which when executed by one or more processors of a cloud-based deployment service, cause the cloud-based deployment service to:
receive a registration request from a User Equipment (UE) is within a first registration area, wherein the registration request includes a first requested slice and a second requested slice;
determine a current network location of the UE is within the first registration area;
in response to determining that the current network location of the UE does not support the first requested slice, identify one or more additional network locations that support the first requested slice;
determine location information associated with the one or more additional network locations in a second registration area; and
transmit a registration response message to the UE, wherein the registration response message includes an acceptance of the registration request for the second requested slice, a rejection of the registration request for the first requested slice, and location information of one or more additional Tracking Area Identities (TAIs) or additional Registration Areas (RAs) that support the first requested slice such that the UE can request registration for the first requested slice when the current network location of the UE is within the second registration area.

19. The one or more non-transitory computer-readable media of claim 18, wherein the location information is determined based on transmitting a message from an Access and Mobility Management Function (AMF) to a Network Slice Selection Function (NSSF).

20. The one or more non-transitory computer-readable media of claim 19, wherein:
the location information is a location hint comprising a Global Positioning System (GPS) location, a GPS coordinate, or a geotagged location;
the current network location of the UE is determined as a current TAI or a current RA of a wireless network; and
the one or more additional TAIs or RAs are associated with a nearby location relative to one or more of the current location of the UE, the current TAI, or the current RA.

* * * * *